United States Patent
Takigawa et al.

(10) Patent No.: US 11,433,478 B2
(45) Date of Patent: Sep. 6, 2022

(54) LASER MACHINING SYSTEM

(71) Applicant: FANUC CORPORATION, Yamanashi (JP)

(72) Inventors: Hiroshi Takigawa, Yamanashi (JP); Tadashi Kurosawa, Yamanashi (JP); Hisatada Machida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 66 days.

(21) Appl. No.: 16/889,949

(22) Filed: Jun. 2, 2020

(65) Prior Publication Data
US 2020/0387131 A1    Dec. 10, 2020

(30) Foreign Application Priority Data
Jun. 7, 2019   (JP) .............................. JP2019-107107

(51) Int. Cl.
*G06F 19/00* (2018.01)
*B23K 26/064* (2014.01)
(Continued)

(52) U.S. Cl.
CPC ............ *B23K 26/064* (2015.10); *G05B 15/02* (2013.01); *G05B 19/182* (2013.01);
(Continued)

(58) Field of Classification Search
CPC ............ H01L 21/6831; B23K 26/1476; B23K 26/0604; B23K 26/067; B23K 26/1224;
(Continued)

(56) References Cited

U.S. PATENT DOCUMENTS 5,938,954 A * 8/1999 Onuma .............. B23K 26/1224
219/121.84
2004/0222197 A1* 11/2004 Hiramatsu .......... B23K 26/067
219/121.7
(Continued)

FOREIGN PATENT DOCUMENTS

JP    2007-030032 A    2/2007
JP    2007-038226 A    2/2007
(Continued)

*Primary Examiner* — Tuan A Vu
(74) *Attorney, Agent, or Firm* — Studebaker & Brackett PC

(57) ABSTRACT

The laser machining system includes a laser device configured to output a laser beam, and a machining head configured to emit the laser beam emitted by a laser oscillator of the laser device and propagated through an optical fiber, to a workpiece in order to perform laser machining. The machining head includes at least one wavelength selective mirror having wavelength selectivity with various values of reflectivity and transmittance according to wavelengths, and at least one image capturing device. The laser machining system monitors abnormality in a laser optical system leading from the laser oscillator to the machining head, during the laser machining, by reflecting light propagated from a side of introduction of the laser beam into the machining head by the wavelength selective mirror, making the light incident on an image capturing surface of the image capturing device, and detecting incident light illuminance distribution appearing on the image capturing surface of the image capturing device.

16 Claims, 14 Drawing Sheets

(51) Int. Cl.
  *G05B 19/18*     (2006.01)
  *G06N 20/00*     (2019.01)
  *G05B 15/02*     (2006.01)
  *G05B 19/4065*   (2006.01)

(52) U.S. Cl.
  CPC ......... *G05B 19/4065* (2013.01); *G06N 20/00* (2019.01); *G05B 2219/45154* (2013.01)

(58) Field of Classification Search
  CPC ......... B23K 26/064; G02B 7/022; G01J 3/24; G01S 17/89; G05B 19/182; G05B 15/02; G05B 2219/45154; G06N 20/00
  See application file for complete search history.

(56) References Cited

U.S. PATENT DOCUMENTS

| | | | | |
|---|---|---|---|---|
| 2008/0308743 | A1* | 12/2008 | Mizuochi | H01L 21/6831 250/440.11 |
| 2010/0165134 | A1* | 7/2010 | Dowski, Jr. | G02B 7/022 348/218.1 |
| 2014/0118738 | A1* | 5/2014 | Comstock, II | G01J 3/24 356/328 |
| 2016/0039045 | A1* | 2/2016 | Webster | G01S 17/89 356/496 |
| 2017/0297144 | A1* | 10/2017 | Nakanishi | B23K 26/0604 |
| 2018/0147671 | A1* | 5/2018 | Bader | B23K 26/1476 |

FOREIGN PATENT DOCUMENTS

| | | |
|---|---|---|
| JP | 2007-054881 A | 3/2007 |
| JP | 2013-099783 A | 5/2013 |

\* cited by examiner

LASER MACHINING SYSTEM

This application is based on and claims the benefit of priority from Japanese Patent Application No. 2019-107107, filed on 7 Jun. 2019, the content of which is incorporated herein by reference.

BACKGROUND OF THE INVENTION

Field of the Invention

The present invention relates to a laser machining system including a machining head capable of monitoring, during laser machining, abnormality occurring in a laser optical system leading from a laser oscillator to the machining head.

Related Art

A recent laser machining high-power laser device is more advanced in power, in order to expand a machinable range (for example, thickness and material) of a machining object (workpiece), perform speedy machining, and other purpose. In particular, a laser device, such as a fiber laser or a direct diode laser, configured with a laser diode (LD) as an excitation light source or a laser source is remarkably advanced in power. In many cases, such a laser device transmits a laser beam from a laser oscillator to a distant location 20 meters to 50 meters away by using a transmission optical fiber, to emit the laser beam toward a workpiece from a machining head connected to the termination part of the transmission optical fiber, thereby performing laser machining such as cutting or welding. In some cases, the laser optical system leading from the laser oscillator to the machining head includes, as a part of the laser optical system, optical components such as a beam combiner for combining a plurality of laser beams propagated through a plurality of optical fibers into one optical fiber, a fiber coupler for coupling a feed fiber to a transmission optical fiber having a different diameter, and a fiber selector for branching the laser beam transmitted by one transmission optical fiber selectively to at least one transmission optical fiber out of a plurality of transmission optical fibers.

A general laser device includes, in the body thereof, an output light detector configured to monitor the light quantity of the laser beam output by a laser oscillator, and a reflected light detector configured to monitor the light quantity of the reflected light (more generally, return light) and the like coming from a workpiece and being propagated in the opposite direction to the direction of the output laser beam in an optical fiber. It is difficult for the output light detector disposed inside the laser device body to detect the abnormality occurring in the laser optical system from the position where the output light detector is disposed to a machining head. In addition, the reflected light detector disposed inside the laser device body may not sufficiently prevent the damage caused by the reflected light in any portion in the laser optical system leading from the machining head to the position where the reflected light detector is disposed, since the reflected light has been propagated through the laser optical system leading from the machining head to the position where the reflected light detector is disposed. Further, it is difficult to prevent the abnormality caused by the reflected light not returning to the optical fiber, in the laser optical system including the machining head.

Therefore, the output light detector and the reflected light detector are disposed not only in the laser device body, but also to the machining head connected to the termination part of the laser optical system. However, if the laser device advanced in power equipped with the machining head even including such an output light detector and such a reflected light detector, as described above, fails to immediately detect minor abnormality occurring in the laser optical system leading from the laser oscillator to the machining head during laser machining, the laser optical system may be instantly damaged to the severe level requiring repair including replacement of expensive units and parts, or damaged in a wide range. Therefore, in a new art, abnormal detection and appropriate control of laser beam output and the like shall be performed, before the occurrence of damage in a wide range, more preferably before the occurrence of severe damage requiring repair.

In the prior art, the light detector disposed to the machining head monitors the light quantity of a laser beam, the reflected light coming from a workpiece and the like, during laser machining, so as to detect abnormality. However, in some cases, in the prior art, when the light quantity is changed significantly, the laser optical system is damaged already, or moreover damaged in a wide range. That is, in the prior art, the laser optical system is not prevented from being damaged.

For example, Patent Document 1 discloses a laser machining head configured to receive a laser beam oscillated and output by a laser oscillating part through a laser transmission optical fiber, and to emit the laser beam toward a machining object. The laser machining head includes a head body having a laser beam outlet on a first surface facing a machining point of the machining object and an optical fiber connection part allowing a termination part of the optical fiber to be attached to a second surface opposite to the first surface, an optical lens disposed in the head body so as to make the laser beam emitted from a termination surface of the optical fiber converge on the machining point of the machining object, a laser beam measuring part attached to the head body so as to measure light intensity of the laser beam emitted from the termination surface of the optical fiber, and a reflected light measuring part attached to the head body so as to measure light intensity of light reflected at the machining point of the machining object into the laser beam outlet. In the present art, a bend mirror is used, which reflects most of the light having a wavelength of a laser beam and partially transmits the light having the wavelength of the laser beam, in order to make the laser beam and the reflected light incident into the laser beam measuring part and the reflected light measuring part.

However, the machining head disclosed in Patent Document 1 measures merely the light quantity of the laser beam emitted from the termination surface of the optical fiber, and thus the fact that the laser beam is abnormal is determined only when the light quantity of the laser beam is changed beyond the amount of the drift due to measurement error, change in temperature of the laser oscillator, or the like. Therefore, even if minor abnormality occurs in any part from the laser oscillator to the termination surface of the optical fiber, the abnormality may not be detected. In Patent Document 1, the ratio or rate of reflected light intensity measurement value of the reflected light coming from the machining point of the machining object to the laser beam intensity measurement value of the laser beam just emitted from the optical fiber is compared with a reference value for determination. In the case where the ratio is larger than the reference value for determination, the machining part is determined to be not abnormal. In the case where the ratio is smaller than the reference value for determination, the machining part is determined to be abnormal. In order to prevent abnormality from being caused by the reflected light in the laser optical system including the machining head, the light quantity of the reflected light returning to the machining head shall be detected precisely. However, with respect to the configuration of the machining head disclosed in Patent Document 1, such as in the case where the optical axis of the output laser beam is slightly inclined not perpendicular to the surface of the machining object, and the case where the focal position of the output laser beam is displaced from the surface of the machining object, the ratio of the light quantity of the reflected light detected by the reflected light measuring part to the light quantity of the reflected light returning to the machining head becomes smaller, and thus the abnormality may not be prevented from being caused by the reflected light in the laser optical system including the machining head.

Patent Document 2 discloses a laser machining monitoring device configured to transmit a laser beam oscillated and output by a laser oscillating part to a laser machining head through a laser transmission optical fiber, and to emit the laser beam through a laser beam outlet of the laser machining head to a machining point of a machining object. The laser machining monitoring device in one aspect includes a first optical fiber for monitoring configured to partially receive, on one edge surface of the first optical fiber for monitoring, the laser beam emitted from a termination surface of the laser transmission optical fiber in the laser machining head, and to transmit the laser beam to a first photoelectric conversion part disposed remotely, a first photoelectric conversion element configured to receive light emitted from the other edge surface of the first optical fiber for monitoring in the first photoelectric conversion part, and to convert the light into a first electric signal, and a signal processing part configured to output monitoring information related to laser power of the laser beam just before being emitted from the laser machining head to the machining point of the machining object, on the basis of the first electric signal output by the first photoelectric conversion element. The laser machining monitoring device in another aspect includes a second optical fiber for monitoring configured to receive, on one edge surface of the second optical fiber for monitoring, partially or all of the light reflected at a machining point of the machining object into the laser beam outlet of the laser machining head, and to transmit the light to a second photoelectric conversion part disposed remotely, a second photoelectric conversion element configured to receive the light emitted from the other edge surface of the second optical fiber for monitoring in the second photoelectric conversion part, and to convert the light into a second electric signal, and a signal processing part configured to determine status of laser power at the machining point of the machining object, on the basis of the second electric signal output by the second photoelectric conversion element, and to output determination result. Patent Document 2 has the same problem as the one in Patent Document 1.

For example, Patent Document 3 discloses a concept of utilizing an image to perform precise monitoring. Patent Document 3 discloses a laser machining monitoring device configured to transmit a laser beam oscillated and output by a laser oscillating part to a laser machining head through a laser transmission optical fiber, and to emit the laser beam from the laser machining head to a machining point of a machining object. The laser machining monitoring device includes a laser beam measuring part having a light receiving surface disposed in the laser machining head, so as to measure light intensity of the laser beam output from a termination surface of the optical fiber in the laser machining head, a reflected light measuring part having a light receiving surface disposed in the laser machining head so as to measure light intensity of the light reflected at the machining point of the machining object into the laser machining head, and a camera attached to the laser machining head so as to capture an image of a vicinity of the machining point of the machining object. However, in the art, only the vicinity of the machining point of the machining object is captured. In the art, although the information relevant to the quality of the laser machining is able to be acquired to some extent, the effect of precisely detecting abnormality in the laser optical system including the machining head is not expected.

Patent Document 4 discloses a laser emission device including a laser oscillator configured to oscillate a laser beam, a laser emission head configured to perform laser machining by emitting the laser beam oscillated by the laser oscillator to a machining object part, and a transmission mechanism configured to transmit the laser beam oscillated by the laser oscillator to the laser emission head. The laser emission head has a protective glass disposed in an emission part of the laser emission head configured to emit the laser beam to the machining object part, a reflection mechanism disposed in the emission head so as to transmit the laser beam and reflect at least visible light out of reflected light coming from the machining object part, an image capturing camera configured to acquire the light reflected by the reflection mechanism, and an optical system for image adjustment disposed between the reflection mechanism and the image capturing camera so as to be able to switch a focal position of the image capturing camera at least to the position of the protective glass and to the position of the machining object. Patent Document 4 further discloses the laser emission device in another aspect, in which the reflection mechanism is configured with a dichroic mirror, and the dichroic mirror includes a drive mechanism. In the laser emission device, the dichroic mirror is able to be set to the position where the visible light made incident from the side of the protective glass is reflected, and to the position where the visible light made incident from the side of a laser beam adjustment unit with the laser beam made incident into the emission head is reflected.

However, according to the indication in Patent Document 4, the position where the visible light made incident from the side of the protective glass is reflected corresponds to the position where the image information of the laser machining part and the surface of the protective glass is acquired during the laser machining and other time, and the position where the visible light made incident from the side of the laser beam adjustment unit with the laser beam made incident into the emission head is reflected corresponds to the position where the image information of the interior optical system in the laser emission head is acquired during when the laser machining is not performed. Further, according to the indication in Patent Document 4, the setting at the latter position disables the laser machining, but allows to check the status of the optical system in the laser beam adjustment unit and the status of the edge part of the optical fiber through the optical system, in terms of presence or absence of damage in these parts. That is, the description in Patent Document 4 does not include the case of acquiring image information relevant to the direction in which the laser beam is made incident into the emission head during the laser machining.

Patent Document 4 discloses the art just to check the occurrence of damage after the laser machining, and never discloses the art to prevent the laser optical system including the laser emission head from being damaged, by detecting minor abnormality in the vicinity of the termination part of the optical fiber through which the laser beam is made incident into the emission head during the laser machining.
Patent Document 1: Japanese Unexamined Patent Application, Publication No. 2007-30032
Patent Document 2: Japanese Unexamined Patent Application, Publication No. 2007-38226
Patent Document 3: Japanese Unexamined Patent Application, Publication No. 2007-54881
Patent Document 4: Japanese Unexamined Patent Application, Publication No. 2013-99783

SUMMARY OF THE INVENTION

As described above, the conventional laser machining head and the conventional laser machining monitoring device including the laser machining head monitor the machining surface of a workpiece during the laser machining by use of the images thereof, and monitor the output laser beam and the reflected light coming from the workpiece, merely on the basis of the light quantities thereof. Therefore, as for the output laser beam, since it is determined that abnormality occurs, only when the light quantity of the output laser beam is changed beyond the amount of the drift due to measurement error, change in temperature of the laser oscillator or the laser optical system, or the like, the devices above are not able to detect minor abnormality in the laser optical system leading from the laser oscillator to the machining head.

Accordingly, the laser optical system is not sufficiently prevented from being damaged to the level requiring partial replacement of the laser optical system, or from being damaged in a wide range. As for the reflected light, the light quantity of the reflected light returning to the machining head and the light quantity of the reflected light detected by the reflected light detector are not in proportional relation such as in the case where the optical axis of the laser beam emitted from the machining head toward the machining surface of the workpiece is not perpendicular to the machining surface of the workpiece, the case where the focal point of the laser beam condensed, emitted toward the machining surface of the workpiece is displaced from the machining surface of the workpiece, and the case where the optical axis of the laser beam emitted toward the machining surface of the workpiece is not perpendicular to the machining surface of the workpiece and where the focal point of the laser beam condensed is displaced from the machining surface of the workpiece.

Therefore, even if excessive reflected light is returned, the devices above may not sufficiently detect the state. Even if some position other than the light receiving surface of the reflected light detector may receive the reflected light with high illuminance, the devices above may not detect the state.

The purpose of the present invention is to provide a laser machining system capable of, with respect to an output laser beam, sensitively and promptly detecting minor abnormality substantially not causing much variation in the light quantity of the output laser beam in the laser optical system and the like, and appropriately controlling the output laser beam prior to the occurrence of damage in the laser optical system and the like, at least prior to the damage expanded in a wide range of the laser optical system and the like, and to provide a laser machining system capable of, with respect to reflected light, sensitively and promptly detecting some position, if any, such as of the inner wall of the machining head body container receiving the reflected light with high illuminance, such as in the case where the optical axis of the laser beam emitted from the machining head toward the machining surface of the workpiece is not perpendicular to the machining surface of the workpiece, and the case where the focal point of the laser beam condensed, emitted toward the machining surface of the workpiece is displaced from the machining surface of the workpiece, and appropriately controlling the output laser beam before the position receiving the reflected light with high illuminance is damaged. In order to perform such detection of abnormality in the laser optical system, the abnormality relevant to the output laser beam shall be detected at the termination part of the laser optical system in the machining head, and the abnormality relevant to the reflected light shall be detected at the inlet to the laser optical system in the machining head. More specifically, the present invention is to provide a laser machining system including a machining head capable of carrying out the detection and monitoring of abnormality as described above, during laser machining.

A laser machining system according to the present disclosure includes a laser device configured to output a laser beam, and a machining head configured to emit the laser beam emitted by a laser oscillator of the laser device and propagated through an optical fiber, to a workpiece in order to perform laser machining. The machining head includes at least one wavelength selective mirror having wavelength selectivity with various values of reflectivity and transmittance according to wavelengths, and at least one image capturing device. The laser machining system monitors abnormality in a laser optical system leading from the laser oscillator to the machining head, during the laser machining, by reflecting light propagated from a side of introduction of the laser beam into the machining head by the wavelength selective mirror, making the light incident on an image capturing surface of the image capturing device, and detecting incident light illuminance distribution appearing on the image capturing surface of the image capturing device.

The laser machining system with the above configuration is capable of acquiring, during the laser machining, not only entire light quantity but also two-dimensional incident light illuminance distribution, as the information included in the light propagated from the side of the introduction of the laser beam into the machining head. Therefore, the laser machining system is able to acquire much more information in terms of the status of the machining head and the incident status of the laser beam, and thereby able to more appropriately monitor abnormality in the laser machining system leading from the laser oscillator to the machining head.

In the laser machining system in another aspect according to the present disclosure, at least the one image capturing device may be a first image capturing device including a pixel having sensitivity at least to light having a wavelength of a laser beam, and the laser beam emitted from a termination surface of the optical fiber connected to the machining head may be made incident to a plurality of the pixels of the image capturing surface of the first image capturing device. The first image capturing device may detect the incident light illuminance distribution appearing on the image capturing surface of the first image capturing device of the laser beam emitted from the termination surface of the optical fiber, and thereby the laser machining system may monitor abnormality in the laser optical system leading from the laser oscillator to the machining head.

The laser machining system with the above configuration is capable of monitoring the output laser beam by use of the sum of the light quantities detected by the respective pixels having sensitivity to the light having the wavelength of the laser beam. The laser machining system is further capable of promptly detecting abnormality, in the case where the light quantity of the output light is reduced due to the abnormality in the laser optical system, by detecting the illuminance distribution appearing when the laser beam is emitted on the image capturing surface under the state of being out of focus. The laser machining system is thus capable of preventing the occurrence of damage and the damage in a wide range in the optical system. The laser machining system is further capable of detecting the minor abnormality in the laser optical system with not much variation in the light quantity, caused due to the eccentricity of the optical fiber in an optical fiber connector part, the excessive curving of the optical fiber, the optical axis deviation of the case where a fiber coupler or a fiber selector is disposed in the middle of the optical fiber or other cause, before the laser optical system is damaged.

In the laser machining system in another aspect according to the present disclosure, at least the one image capturing device may be a second image capturing device including a pixel having sensitivity to light having at least one wavelength other than a wavelength of a laser beam. The second image capturing device may be capable of capturing at least an image of a laser beam introduction side inner wall and the like of a machining head body container.

The laser machining system with the above configuration is capable of capturing an image, especially, an infrared image, of the laser beam introduction side inner wall of the machining head body container during laser machining. This allows the laser machining system to promptly and sensitively detect the temperature rise of the laser beam introduction side inner wall and the like of the machining head body container caused by the reflected light not returning to the termination surface of the optical fiber (the surface of the laser beam emitting end of the optical fiber) during the laser machining, such as in the case where the optical axis of the laser beam emitted from the machining head toward the machining surface of the workpiece is not perpendicular to the machining surface of the workpiece, and the case where the focal point of the laser beam condensed, emitted toward the machining surface of the workpiece is displaced from the machining surface of the workpiece. The laser machining system is thus able to prevent the machining head from being damaged by the temperature rise.

In the laser machining system in another aspect according to the present disclosure, the image capturing device may be a first color image capturing device including pixels having respectively different sensitivity at least to light having a wavelength of a laser beam and to light having at least one wavelength other than the wavelength of the laser beam. The first color image capturing device may capture at least an image of a laser beam introduction side inner wall of a machining head body container, by use of the pixel of the first color image capturing device having high sensitivity to the light having at least one wavelength other than the wavelength of the laser beam, and may detect the incident light illuminance distribution appearing on the image capturing surface of the first color image capturing device of the laser beam emitted from a termination surface of the optical fiber connected to the machining head, and made incident to a plurality of the pixels of the first color image capturing device having high sensitivity to the light having the wavelength of the laser beam, by use of the pixel of the first color image capturing device having high sensitivity to the light having the wavelength of the laser beam.

In the laser machining system with the above configuration, the one image capturing device is capable of detecting the light quantity of the output laser beam and the incident light illuminance distribution appearing on the image capturing surface, and monitoring the abnormality in the laser optical system all the time, and also capable of promptly and sensitively detecting the temperature rise of the laser beam introduction side inner wall and the like of the machining head body container caused by the reflected light not returning to the termination surface of the optical fiber (the surface of the laser beam emitting end of the optical fiber) during the laser machining. This allows to simplify the optical system for image capturing with a smaller number of image capturing devices, thereby enabling to provide the machining head with lighter weight in a smaller size.

In the laser machining system in another aspect according to the present disclosure, the machining head may further include an optical sensor configured to detect at least reflected light coming from the workpiece and being reflected by the wavelength selective mirror.

The laser machining system with the above configuration is capable of further monitoring the light quantity of the reflected light coming from the workpiece simultaneously, by reflecting the reflected light coming from the workpiece by the surface of the wavelength selective mirror, such as a dichroic mirror, opposite to the surface which reflects the light coming from the side where the laser beam is introduced into the machining head, so as to make the reflected light incident to the optical sensor. This allows the laser machining system to control the laser beam output, by detecting the light quantity of the reflected light during the laser machining, substantially at the closest position to the inlet of the reflected light in the laser machining system. Accordingly, the laser machining system is effectively prevented from being damaged by the reflected light.

In the laser machining system in another aspect according to the present disclosure, the machining head may further include a third image capturing device configured to acquire an image of a machining surface of the workpiece by reflecting light coming from the machining surface of the workpiece by the wavelength selective mirror.

The laser machining system with the above configuration is further capable of further acquiring the image of the machining surface of the workpiece simultaneously, by reflecting the light coming from the machining surface of the workpiece by the surface of the wavelength selective mirror opposite to the surface which reflects the light coming from the side where the laser beam is introduced into the machining head, so as to make the reflected light incident to the third image capturing device. This allows the laser machining system to monitor the quality of the laser machining state of the workpiece.

In the laser machining system in another aspect according to the present disclosure, the machining head may further include a second color image capturing device including pixels having respectively different sensitivity at least to light having the wavelength of the laser beam and to light having at least one wavelength other than the wavelength of the laser beam. The second color image capturing device may detect at least reflected light of the laser beam coming from the workpiece and being reflected by the wavelength selective mirror so as to be made incident to the second color image capturing device, by use of the pixel of the second color image capturing device having high sensitivity to the light having the wavelength of the laser beam, to monitor a light quantity of the reflected light, and may detect at least light reflected by the wavelength selective mirror to be made incident to the second color image capturing device, having a different wavelength from the wavelength of the laser beam coming from the machining surface of the workpiece, by use of the pixel of the second color image capturing device having high sensitivity to the light having a wavelength other than the wavelength of the laser beam, to capture an image of the machining surface of the workpiece.

The laser machining system with the above configuration is capable of not only detecting (or monitoring) the light quantity of the reflected light coming from the workpiece, but also acquiring the image of the machining surface of the workpiece, by reflecting the light coming from the machining surface of the workpiece including the reflected light coming from the workpiece, by the surface of the wavelength selective mirror opposite to the surface which reflects the light coming from the side where the laser beam is introduced into the machining head, so as to make the reflected light incident to the second color image capturing device. This allows laser machining system to monitor the quality of the laser machining state of the workpiece, while monitoring the light quantity of the reflected light.

The laser machining system in another aspect according to the present disclosure may further include a calculation circuit configured to calculate a temperature of a protective window of the machining head just before stop of laser beam emission, on the basis of time series data of light quantities of light having at least two wavelengths having been detected by the second color image capturing device since just after the stop of the laser beam emission.

In the laser machining system with the above configuration, the focal point of the second color image capturing device is adjusted on the machining surface of the workpiece, and the protective window is thus subjected to image capturing under the state of being out of focus. However, the light quantity of the radiant light coming from the protective window is detectable. Thus, the laser machining system is capable of easily calculating the temperature of the protective window just before the stop of the laser beam emission on the basis of the time series data indicating the attenuation of the respective light quantities of the light having at least two wavelengths due to the radiation since just after the stop of the laser beam emission. As a result of the calculation, it is estimated that the absorptivity of the protective window to the laser beam is increased due to a stain or the like on the protective window because the calculated temperature is increased, thereby enabling to notify a user of the maintenance timing of the protective window.

In the laser machining system in another aspect according to the present disclosure, the machining head may further include a reflectivity variable device capable of varying reflectivity, and the image capturing device may be a fourth image capturing device including a pixel having sensitivity to light having at least one wavelength other than a wavelength of a laser beam. The fourth image capturing device may acquire at least an image of a laser beam introduction side inner wall of a machining head body container, and an image of a machining surface of the workpiece.

In the laser machining system including the reflectivity variable device capable of varying reflectivity as described above, the one image capturing device is capable of acquiring, during the laser machining, the image (infrared image) of the laser beam introduction side inner wall and the like of the machining head body container, thereby enabling to promptly and sensitively detect the temperature rise of the laser beam introduction side inner wall and the like of the machining head body container by the reflected light not returning to the surface of the laser beam emitting end of the optical fiber during the laser machining. In addition, the laser machining system with the above configuration is capable of acquiring the image of the machining surface of the workpiece, to monitor the quality of the laser machining state of the workpiece. This allows to simplify the optical system for image capturing with a smaller number of image capturing devices, thereby enabling to provide the machining head with lighter weight in a smaller size.

In the laser machining system in another aspect according to the present disclosure, the machining head may further include a reflective variable device capable of varying reflectivity, and the image capturing device is a third color image capturing device including pixels having respectively different sensitivity at least to light having a wavelength of a laser beam and light having at least one wavelength other than the wavelength of the laser beam. The third color image capturing device may detect a light quantity of an output laser beam and the incident light illuminance distribution appearing on the image capturing surface and may capture at least an image of a laser beam introduction side inner wall of a machining head body container, and may further detect a light quantity of reflected light coming from the workpiece and may capture an image of a machining surface of the workpiece.

In the laser machining system including the reflectivity variable device capable of varying reflectivity as described above, the one color image capturing device is capable of detecting the light quantity of the output laser beam and the incident light illuminance distribution appearing on the image capturing surface, and detecting promptly and sensitively the temperature rise of the laser beam introduction side inner wall and the like of the machining head body container by the reflection light not returning to the surface of the laser beam emitting end of the optical fiber during the laser machining. In addition, the laser machining system is capable of not only detecting the light quantity of the reflected light coming from the workpiece, but also acquiring the image of the machining surface of the workpiece. This allows to simplify the optical system for image capturing with a smaller number of color image capturing devices, thereby enabling to provide the machining head with lighter weight in a smaller size.

In the laser machining system in another aspect according to the present disclosure, the reflectivity variable device may be any one of a digital mirror device, a liquid crystal panel, a light control mirror device, and a reflector with shutter.

In the laser machining system, the reflectivity variable device is configured with a digital mirror device, a liquid crystal panel or the like as described above, thereby enabling to provide, in particular, the machining head with lighter weight in a smaller size.

In the laser machining system in another aspect according to the present disclosure, the laser machining system may be connected to a machine learning device, and the machine learning device may be configured to acquire, as input data, at least light output command data issued to the laser oscillator and data of the incident light illuminance distribution, acquire, as a label, an evaluation value indicating whether the laser optical system leading from the laser oscillator to the machining head is in a normal state or an abnormal state, prepare the input data and the label in a pair as teacher data, learn relation between the input data and the label by supervised learning and build a learning model, output, as a prediction value, prediction result indicating presence or absence of the abnormality in the laser optical system leading from the laser oscillator to the machining head, by using the learning model, with respect to new input data including at least light output command data and data of the incident light illuminance distribution, and when the prediction result indicating occurrence of the abnormality in the laser optical system is output, stop or reduce the output laser beam to be output by the laser device.

The laser machining system with the above configuration is capable of detecting the occurrence of the abnormality in the laser optical system, in response to even slight change in the incident light illuminance distribution detected during laser emission. This allows the laser machining system to perform the control of the output laser beam and other processing, thereby enabling to prevent the laser optical system from being damaged, and prevent the damage in the laser optical system from being expanded.

In the laser machining system in another aspect according to the present disclosure, the laser machining system may be connected to a machine learning device, and the machine learning device may be configured to acquire, as input data, at least image data of the machining surface of the workpiece and time series data of laser machining condition data, acquire, as a label, time series data of an evaluation value indicating quality in laser machining result corresponding to the input data, prepare the input data and the label in a pair as teacher data, learn relation between the input data and the label by the supervised learning and build a learning model, output, as a prediction value, prediction result indicating quality in laser machining result and change in the laser machining result caused by change in laser machining conditions, by using the learning model, with respect to new input data including at least image data of the machining surface of the workpiece and laser machining condition data, and when the prediction result indicating that the laser machining result will not be excellent is output, modify the laser machining conditions.

The laser machining system with the above configuration is capable of predicting the laser machining result with respect to the image data of the machining surface of the workpiece detected during the laser machining under certain laser machining conditions, and capable of modifying, as necessary, the current laser machining conditions to the laser machining conditions allowing to provide excellent laser machining result.

In the laser machining system in another aspect according to the present disclosure, the machine learning device may be communicably connected to a plurality of the laser devices via a communication network, and the machine learning device may perform the supervised learning, by utilizing the input data and the label in the pair acquired from the plurality of laser devices.

The laser device with the above configuration is configured with many elements, just as for the elements in the laser optical system, including a laser oscillator, a delivery fiber and a machining head. The laser device configured with a different configuration acquires a different learning result.

Accordingly, the laser machining system hardly acquires sufficient learning result in an early stage, by utilizing just the samples in pairs of the input data and the labels output by a small number of the laser devices. The laser machining system with the above configuration performs the learning by utilizing the information output by the plurality of laser devices, thereby enabling to advance the learning speedily and improve the precision in the learning.

In the laser machining system in another aspect according to the present disclosure, at least one of the laser devices may include a learning result recording part configured to record the learning model. The laser machining system may record the learning model built by the machine learning device, in the learning result recording part, and may output the prediction value with respect to data input in the learning result recording part, by using the learning model recorded in the learning result recording part.

The laser machining system with the above configuration is capable of utilizing the learning result even when the laser device is disconnected from the communication network, thereby eliminating time delay in communication, and enabling to more promptly perform abnormality detection and the like. In addition, the laser machining system eliminates the need of occupying the machine learning device, resulting in reducing operation cost.

The laser machining system according to the present disclosure is capable of preventing the laser optical system leading from the laser oscillator to the machining head from being damaged and preventing the damage from being expanded, by sensitively and promptly detecting minor abnormality in the laser optical system, and further capable of preventing the damage of the machining head due to the temperature rise caused by the reflected light, and additionally capable of modifying the current laser machining conditions to the laser machining conditions allowing to provide excellent laser machining result, by monitoring the image of the machining surface of the workpiece.

DETAILED DESCRIPTION OF THE INVENTION

Figure 1:
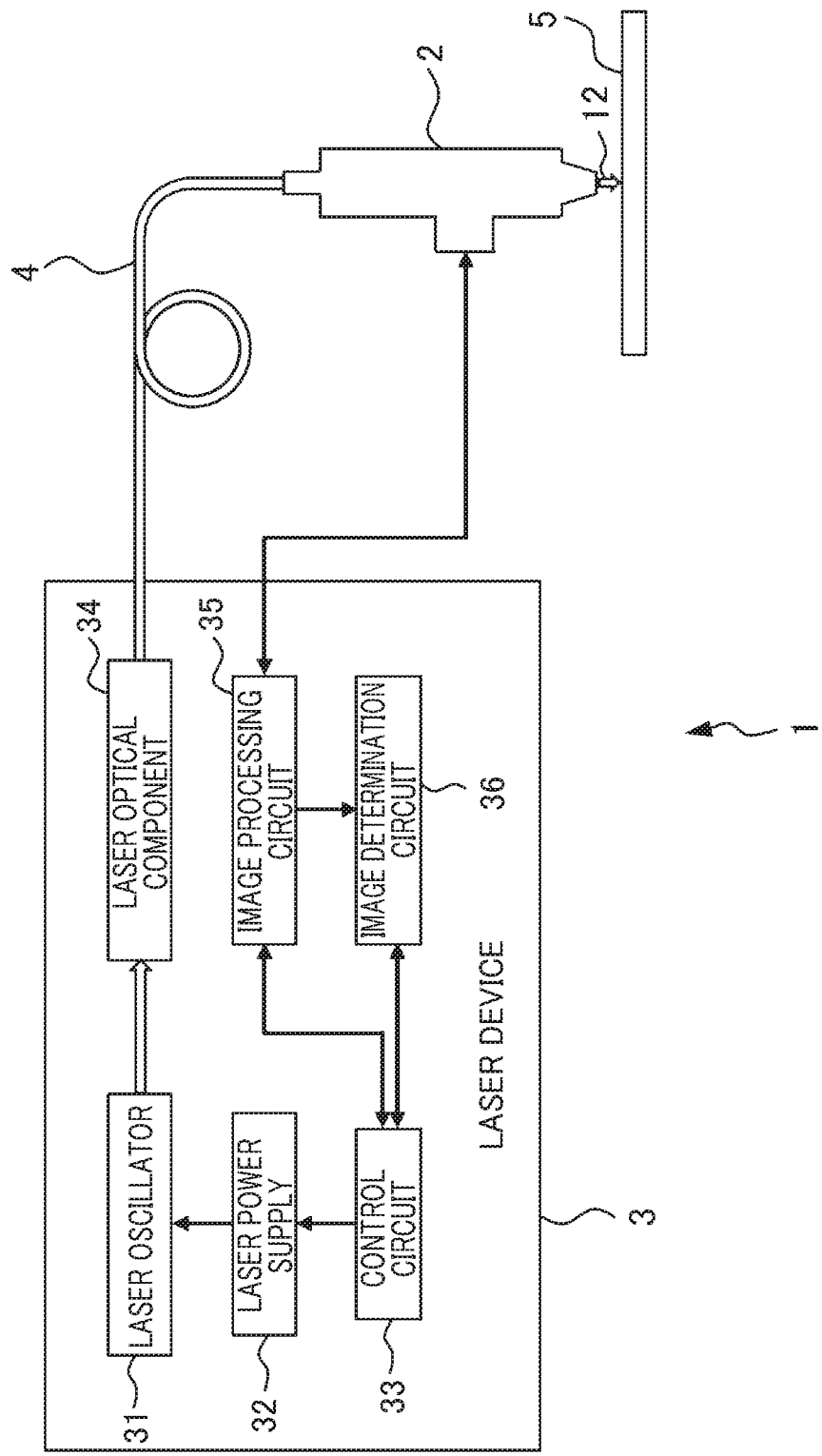
FIG. 1 is a block diagram illustrating a configuration in a conceptual manner of a laser machining system according to a first embodiment.

Some embodiments of a laser machining system will be described below by referring to the drawings. In each drawing, the same members are denoted by the same reference numeral. The components denoted by the same reference numeral in different drawings have the same function. It is noted that these drawings are changed in scale as appropriate for easy understanding. The forms in the drawings are illustrated each merely as one example of the present disclosure. The laser machining system according to the present disclosure is not limited to the illustrated forms.

First Embodiment

Figure 2:
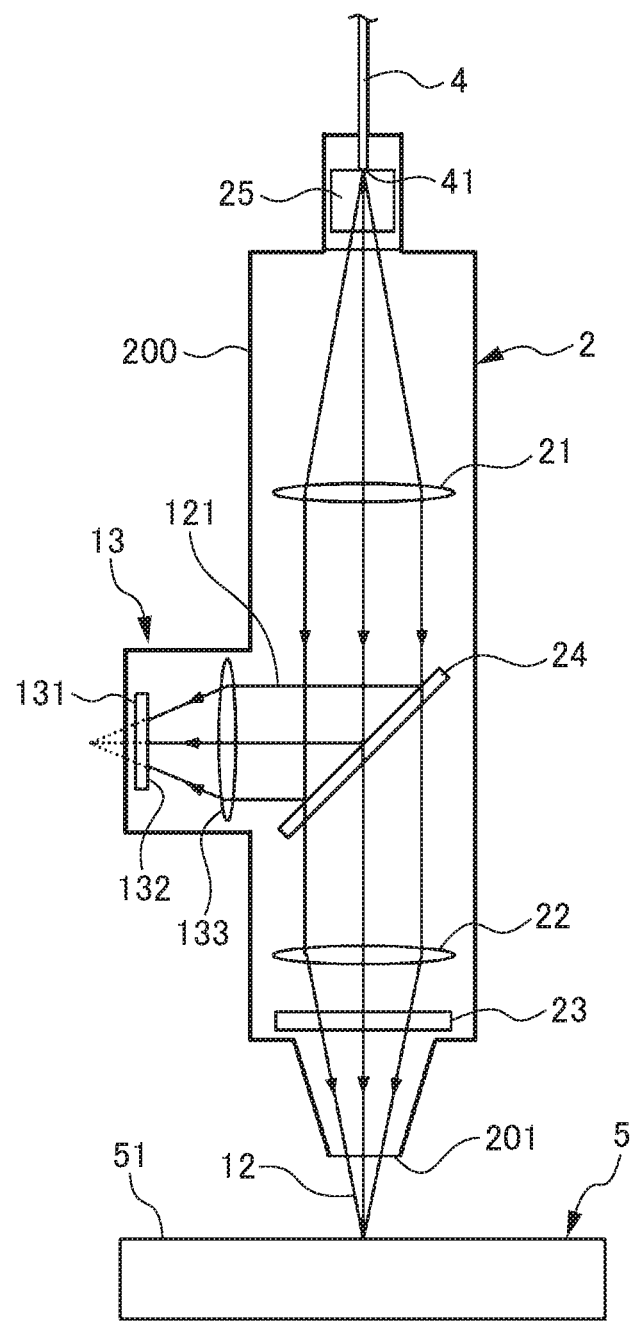
FIG. 2 is a schematic cross-sectional view of a machining head included in the laser machining system according to the first embodiment.

FIG. 1 is a block diagram illustrating a configuration in a conceptual manner of a laser machining system according to a first embodiment. FIG. 2 is a schematic cross-sectional view of a machining head included in the laser machining system shown in FIG. 1. A laser machining system 1 includes not only a machining head 2, but also a laser device 3, an optical fiber 4 configured to propagate a laser beam 12 output by the laser device 3 to the machining head 2, a drive mechanism (not shown) configured to change relative locations of the machining head 2 and a workpiece 5 corresponding to a machining object subjected to laser machining, and the like. The laser device 3 of the present embodiment includes an image processing circuit 35 and an image determination circuit 36, in addition to the components included in the general laser device 3, such as a laser oscillator 31, a laser power supply 32, a control circuit 33, a drive circuit (not shown), and a laser optical component 34. In FIG. 1, each of the arrows in thick solid lines schematically indicates a signal line and the like, and the direction thereof.

The laser oscillator 31 outputs the laser beam 12 in response to the light output command issued by the control circuit 33. It is noted that the abbreviated description in the present specification that the control circuit 33 outputs a light output command to the laser oscillator 31 means that the control circuit 33 outputs a power output command to the laser power supply 32 to supply driving power to the laser oscillator 31.

The laser beam 12 output by the laser oscillator 31 is led to the outside of the laser device 3 through the optical fiber 4 via the laser optical component 34, as necessary, such as a fiber coupler for allowing the laser beam to be propagated between optical fibers having different core diameters, a beam combiner for combining a plurality of laser beams into a single laser beam, and a fiber selector for branching the laser beam propagated through one optical fiber into a plurality of optical fibers. The laser beam 12 having been propagated through the optical fiber 4 is emitted from the machining head 2 to a machining surface 51 of the workpiece 5, whereby the laser machining is carried out. It is noted that, in the present specification, the portion leading from the laser oscillator 31 to the machining head 2 through which the laser beam 12 is propagated is referred to as a laser optical system.

The control circuit 33 includes an operation circuit, such as a CPU, configured to execute operation processing for various types of control of the laser device 3, a memory circuit configured to record programs, data and the like required in various types of control of the laser device 3, a drive circuit configured to drive the laser power supply 32 and the drive mechanism, a communication circuit configured to communicate with respective parts of the laser device 3, such as the image processing circuit 35 and the image determination circuit 36, and other circuits. The control circuit 33 may be configured with an FPGA (field programmable gate array).

As shown in FIG. 2, the optical fiber 4 is connected to one end of the machining head 2. The optical fiber 4 connected to the machining head 2 has a termination surface 41 connected to a quartz block 25 disposed in the one end of the machining head 2. In FIG. 2, each of the solid lines with arrows in the machining head 2 schematically indicates a light flux of the laser beam 12 which is emitted from the termination surface 41 of the optical fiber 4 so as to be introduced into a machining head body container 200. Each of the arrows schematically indicates an advancing direction of light. As shown in FIG. 2, the laser beam 12 which is emitted from the termination surface 41 of the optical fiber 4 so as to be introduced into the machining head body container 200 passes via a collimating lens 21 configured to collimate the laser beam 12, a condenser lens 22 configured to condense the laser beam 12 to the machining surface 51 of the workpiece 5, and a protective window 23 configured to maintain the interior of the machining head 2 clean, and is emitted from a laser beam emitting end 201 disposed at the other end of the machining head 2, to the machining surface 51 of the workpiece 5.

As shown in FIG. 2, the machining head 2 in the present embodiment includes, inside the body thereof between the collimating lens 21 and the condenser lens 22, a wavelength selective mirror 24 which has wavelength selectivity with various values of reflectivity and transmittance according to wavelengths. The wavelength selective mirror 24 transmits at least 99% of the light having the wavelength of the laser beam 12 and reflects only the minimal part thereof. In the present embodiment, the light having a different wavelength from the wavelength of the laser beam 12 is not specified in terms of reflectivity or transmittance. The wavelength selective mirror 24 is disposed substantially at 45 degrees with respect to the light flux of the laser beam 12 between the collimating lens 21 and the condenser lens 22, so as to bend, by 90 degrees, the direction of the laser beam 12 collimated by the collimating lens 21.

The machining head 2 includes a first image capturing device 13 having an image capturing surface 132 on which a laser beam 121 (a part of the laser beam 12) reflected by the wavelength selective mirror 24 out of the laser beam 12 collimated by the collimating lens 21 is made incident. The first image capturing device 13 is configured with a solid-state image capturing element 131 such as a CCD image sensor or a CMOS image sensor. The image capturing surface 132 includes pixels arranged two-dimensionally, each having sensitivity to the light having the wavelength of the laser beam 12. In front of the image capturing surface 132 of the first image capturing device 13, a converging lens 133 is disposed so as to converge the laser beam 121 reflected by the wavelength selective mirror 24, on the image capturing surface 132. The image data captured on the image capturing surface 132 of the first image capturing device 13 is output to the image processing circuit 35 of the laser device 3. It is noted that the image capturing surface 132 including the pixels arranged two-dimensionally each having sensitivity to light corresponds to the surface on which light receiving parts (photodiodes) of the solid-state image capturing element 131 are arranged.

The most part of the laser beam 12 which is emitted from the termination surface 41 of the optical fiber 4 so as to be introduced into the machining head 2 is transmitted through the wavelength selective mirror 24 and the protective window 23, and is emitted so as to be converged on the machining surface 51 of the workpiece 5, whereby the laser machining is carried out. On the other hand, the minimal laser beam 121 which is emitted from the termination surface 41 of the optical fiber 4 and reflected by the wavelength selective mirror 24 is made incident on the image capturing surface 132 of the first image capturing device 13 via the converging lens 133. The converging lens 133 is configured to irradiate the image capturing surface 132 with the laser beam 121 reflected by the wavelength selective mirror 24 in a spread state, without condensing the beam 121 on one point of the image capturing surface 132. In FIG. 2, the lines illustrated by dashed lines extended from the light flux of the laser beam 121 reflected by the wavelength selective mirror 24 schematically indicate the focal position of the light flux of the laser beam 121. As illustrated by the dashed lines, the converging lens 133 condenses the laser beam 121 at a position beyond the image capturing surface 132. Therefore, the first image capturing device 13 detects the image data of two-dimensional incident light illuminance distribution appearing on the image capturing surface 132. Since the focal point is not adjusted on the termination surface 41 of the optical fiber 4 as viewed from the first image capturing device 13, the image processing circuit 35 receives the output by the first image capturing device 13, and in general acquires the image with the illuminances varied coaxially along the radial direction, as the incident light illuminance distribution appearing on the image capturing surface 132.

The image determination circuit 36 stores the reference image (the image of the incident light illuminance distribution in a normal state) captured in advance by the first image capturing device 13 of the laser machining system 1 in a normal state. The image determination circuit 36 compares the image of the incident light illuminance distribution output by the image processing circuit 35 and the reference image, to determine whether or not the displacement between the images is more than a predetermined range. When determining the displacement between the images as being more than a predetermined range, for example, on the basis that a peak position in the incident light illuminance distribution is displaced by a predetermined range or more, the image determination circuit 36 determines that abnormality has occurred in the laser optical system leading from the laser oscillator 31 to the machining head 2, and outputs the determination result to the control circuit 33. In response to the determination result of the occurrence of abnormality output by the image determination circuit 36, the control circuit 33 issues, for example, a command to stop laser oscillation to the laser oscillator 31.

The image determination circuit 36 is configured to compare the value obtained by summing the light quantities of the emitted light detected at respective pixels on the image capturing surface 132 of the first image capturing device 13, with the light output command value output by the control circuit 33 to the laser oscillator 31, or with the light output value converted from the value detected by the output light detectors (not shown) disposed inside the laser oscillator 31 and in the middle of the laser optical system so as to detect the output laser beam, determine that abnormality has occurred in the laser optical system also in the case where the difference between the two values is more than a predetermined value, and output the determination result to the control circuit 33. In this case also, the control circuit 33 issues, for example, the command to stop laser oscillation to the laser oscillator 31.

Each of the image processing circuit 35 and the image determination circuit 36 includes, as with the control circuit 33, an operation circuit, such as a CPU, configured to execute operation processing for image processing or image determination, a memory circuit configured to record programs, data and the like required for the operation processing, a communication circuit configured to communicate with the control circuit 33 and respective parts of the image capturing devices and other parts. In FIG. 1, the respective circuits are illustrated separately as functional blocks by function. The circuits may not be separated physically. In an example, the control circuit 33 may be configured to have the functions of the image processing circuit 35 and the image determination circuit 36.

The laser machining system 1 with the configuration and the operation according to the present embodiment described above is capable of, in the case where the output light is reduced due to the abnormality occurring in the laser optical system during the laser machining, not only promptly detecting the abnormality and thereby preventing the optical system from being damaged and the damage from being expanded, but also detecting the minor abnormality with not much variation in the light quantity in the laser optical system, caused due to the eccentricity of the optical fiber 4 in an optical fiber connector part, the excessive curving of the optical fiber 4, the optical axis deviation of the case where a fiber coupler or a fiber selector is disposed in the middle of the optical fiber 4 or other cause, before the laser optical system is damaged, and thereby preventing the damage.

Second Embodiment

Figure 3:
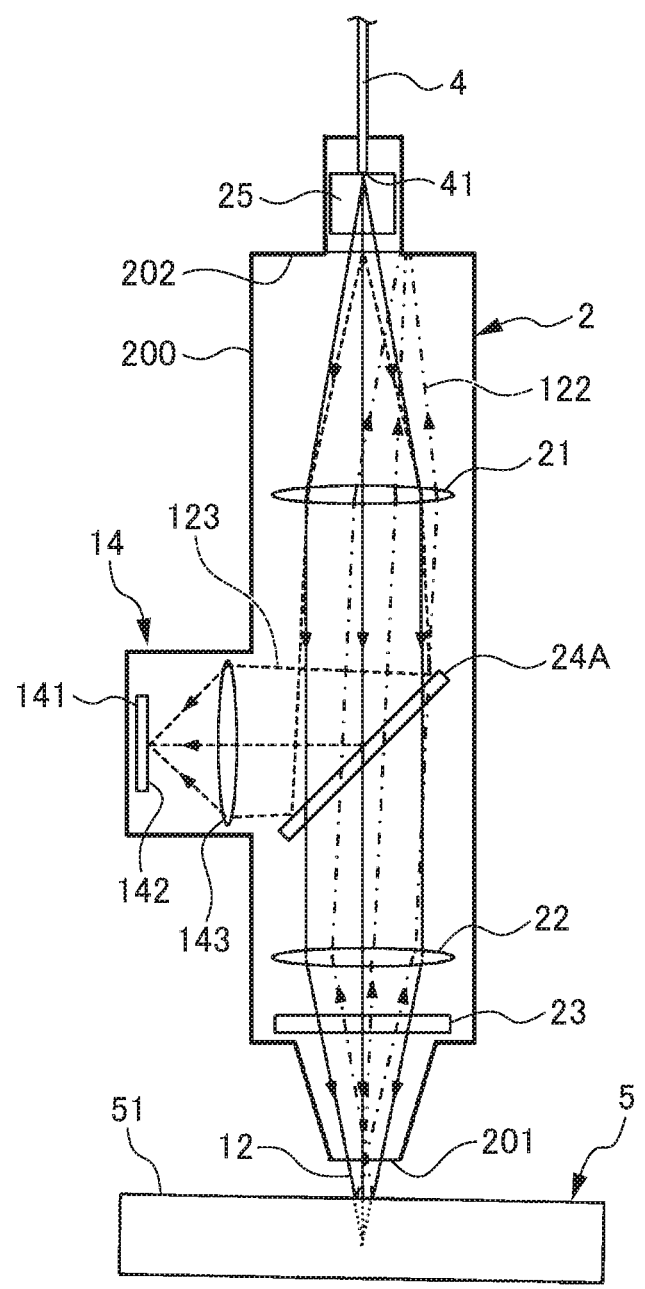
FIG. 3 is a schematic cross-sectional view of a machining head included in a laser machining system according to a second embodiment.

FIG. 3 is a schematic cross-sectional view of a machining head included in a laser machining system according to a second embodiment. The machining head 2 in the present embodiment has, between the collimating lens 21 and the condenser lens 22, a wavelength selective mirror 24A disposed in the same manner as the wavelength selective mirror 24 in the first embodiment. The wavelength selective mirror 24A in the present embodiment shall be the mirror which, as optical characteristics, transmits at least 99% of the light having the wavelength of the laser beam and reflects only a minimal part thereof, and which reflects, at high reflectivity, for example, 50% or higher, the light having a different wavelength from the wavelength of the laser beam and corresponding to the visible light or the light in near infrared region to which a second image capturing device 14 to be described below has sensitivity.

In FIG. 3, each of the solid lines with arrows in the machining head 2, as with the solid lines in FIG. 2, schematically indicates the light flux of the laser beam 12 which is emitted from the termination surface 41 of the optical fiber 4 so as to be introduced into the machining head body container 200. Each of the arrows schematically indicates an advancing direction of light. The most part of the laser beam 12 emitted from the termination surface 41 of the optical fiber 4 is transmitted through the wavelength selective mirror 24A and the protective window 23, and is emitted so as to be converged on the machining surface 51 of the workpiece 5, whereby the laser machining is carried out. In FIG. 3, each of the one-dot chain lines with arrows in the machining head 2 schematically indicates the light flux of a reflected light 122 generated when the laser beam 12 emitted to the workpiece 5 is reflected by the machining surface 51 of the workpiece 5 and returned to the machining head 2.

FIG. 3 indicates the case where the optical axes of the collimating lens 21 and the condenser lens 22 in the machining head 2 are not perpendicular to the machining surface 51 of the workpiece 5, and where the focal position of the laser beam 12 emitted from the machining head 2 is not adjusted on the machining surface 51 of the workpiece 5. In such a case, the reflected light 122 may not return to the termination surface 41 of the optical fiber 4. In this case, the reflected light 122 is possibly converged on a laser beam introduction side inner wall 202 positioned opposite to the laser beam emitting end 201 in the machining head body container 200, or other part, thereby increasing the temperature of the converged part, resulting in damaging the machining head 2 due to burning or the like.

The reflected light 122 returning to the termination surface 41 of the optical fiber 4 is able to be detected by the reflected light detectors (not shown) disposed inside the laser oscillator 31 and in the middle of the laser optical system so as to detect the reflected light (returning light). In the case where the reflected light exceeding a predetermined level is detected by the reflected light detectors, reduced laser beam may be output, or the output of the laser beam may be stopped, in order to prevent the laser oscillator 31 and the laser optical system from being damaged. However, in the case where the reflected light 122 does not return to the termination surface 41 of the optical fiber 4 as described above, it is difficult to accurately detect the increase of the reflected light 122. Alternatively, a temperature sensor such as a thermistor may be disposed in the machining head 2 so as to detect abnormal temperature rise of the machining head 2. In this case, it takes time to increase the temperature of the entire portion where the temperature sensor is disposed, and moreover the response speed of the temperature sensor is not fast. Therefore, the machining head 2 may be damaged before the detection of abnormality by the temperature sensor.

To deal with such a problem, the machining head 2 in the present embodiment has the second image capturing device 14 inside the machining head body container 200. The second image capturing device 14, as with the first image capturing device 13, is configured with a solid-state image capturing element 141 such as a CCD image sensor or a CMOS image sensor, and includes an image capturing surface 142 including the pixels arranged two-dimensionally having sensitivity to light. The pixels arranged two-dimensionally on the image capturing surface 142 have sensitivity to the light which has a wavelength other than that of the laser beam 12 and which is visible light or infrared light having at least one wavelength to which the wavelength selective mirror 24A has a high reflectivity.

In FIG. 3, each of the dashed lines with arrows schematically indicates the light flux of a radiant light 123 coming from the laser beam introduction side inner wall 202 and the like due to the temperature rise at the time when the reflected light 122 is converged on the laser beam introduction side inner wall 202 and the like. As shown in FIG. 3, the radiant light 123 is reflected by the wavelength selective mirror 24A, so as to be made incident on the image capturing surface 142 of the second image capturing device 14. In front of the image capturing surface 142 of the second image capturing device 14, a converging lens 143 is disposed so as to converge the radiant light 123 reflected by the wavelength selective mirror 24A, on the image capturing surface 142.

The converging lens 143 converges the radiant light 123 emitted from one point, on one point of the image capturing surface 142 of the second image capturing device 14. Thus, the second image capturing device 14 is configured to capture an image of the radiant light 123 reflected by the wavelength selective mirror 24A. The image of the radiant light 123 includes temperature information of the portion where the reflected light 122 is converged. The image data captured by the second image capturing device 14 is output to the image processing circuit 35 of the laser device 3.

In the laser machining system 1 in the present embodiment, the second image capturing device 14 and the image processing circuit 35 acquire the image of the radiant light 123 coming from the laser beam introduction side inner wall 202 and the like of the machining head body container 200, all the time even during the laser machining. In the case where, during the laser machining, the temperature of the laser beam introduction side inner wall 202 and the like is increased by the reflected light 122, the radiant light 123 from the portion with the temperature rise is increased. The image processing circuit 35 converts the image of the radiant light 123 into temperature distribution data. The image determination circuit 36 compares the temperature distribution data relevant to the radiant light 123 output by the image processing circuit 35, with a reference temperature stored in advance (a predetermined temperature lower than the alarm temperature at which the machining head 2 may be damaged), to determine whether or not the maximum temperature in the temperature distribution data relevant to the radiant light 123 is higher than the reference temperature. The image determination circuit 36, when determining that the maximum temperature in the temperature distribution data relevant to the radiant light 123 is higher than the reference temperature, determines that abnormality has occurred in the laser optical system leading from the laser oscillator 31 to the machining head 2, and outputs the determination result to the control circuit 33. In response to the determination result by the image determination circuit 36 that abnormality has occurred, the control circuit 33 issues, for example, the command to stop laser oscillation to the laser oscillator 31.

The laser machining system 1 in the present embodiment is capable of preventing the machining head 2 from being damaged, by promptly detecting the temperature rise of the portion where the reflected light 122 is converged to determine abnormality, stopping the output of the laser beam, and issuing a light output command to reduce the output of the laser beam. In the case where the protective window 23 reflects the laser beam 12 due to the stain thereof, the reflected light by the protective window 23 may be converged on the laser beam introduction side inner wall 202 and the like, not returning to the termination surface 41 of the optical fiber 4, thereby causing temperature rise, resulting in damaging the machining head 2. Even in such a case, the laser machining system 1 in the present embodiment is capable of preventing the damage of the machining head 2 caused by such reflected light. It is noted that, in order to further reduce the influence by the laser beam on the second image capturing device 14, a filter (not shown) for blocking the light having the wavelength of the laser beam may be disposed in front of the second image capturing device 14.

Third Embodiment

Figure 4:
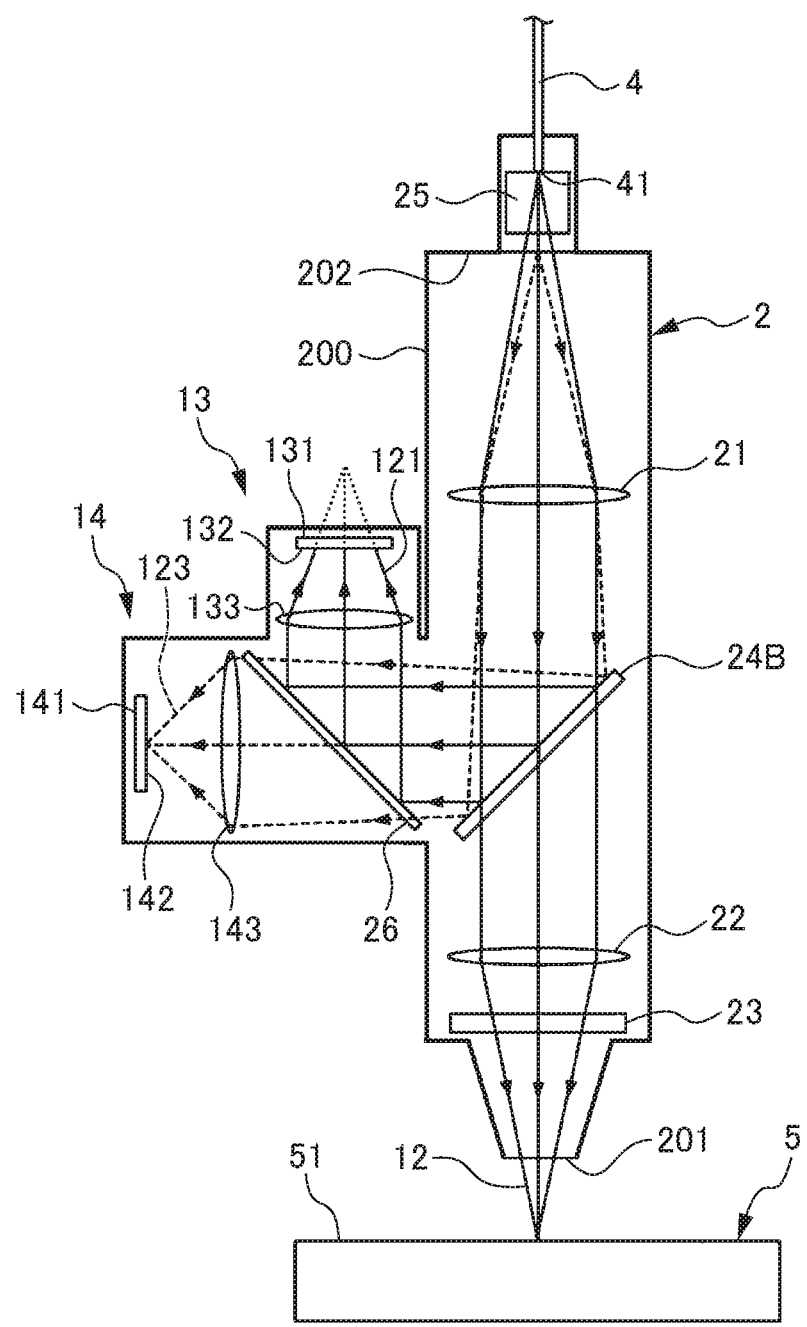
FIG. 4 is a schematic cross-sectional view of a machining head included in a laser machining system according to a third embodiment.

FIG. 4 is a schematic cross-sectional view of a machining head included in a laser machining system according to a third embodiment. The laser machining system 1 in the present embodiment has, between the collimating lens 21 and the condenser lens 22 in the machining head 2, a wavelength selective mirror 24B disposed in the same manner as the wavelength selective mirror 24 in the first embodiment. As in the case of the second embodiment, the wavelength selective mirror 24B shall be the mirror which, as optical characteristics, transmits at least 99% of the light having the wavelength of the laser beam 12 and reflects only a minimal part thereof, and which reflects, at high reflectivity, for example, 50% or higher, the light having a different wavelength from the wavelength of the laser beam 12 and corresponding to the visible light or the light in near infrared region to which the second image capturing device 14 has sensitivity.

The machining head 2 in the present embodiment includes both of the first image capturing device 13 included in the machining head 2 in the first embodiment and the second image capturing device 14 included in the machining head 2 in the second embodiment.

In FIG. 4, as in the first embodiment, each of the thin solid lines with arrows in the machining head 2 schematically indicates the light flux of the laser beam 12 emitted from the termination surface 41 of the optical fiber 4 or the laser beam 121 generated when a part of the laser beam 12 is reflected by the wavelength selective mirror 24B. Each of the dashed lines with arrows, as with the lines in the second embodiment, schematically indicates the light flux of the radiant light 123 coming from the laser beam introduction side inner wall 202 and the like of the machining head body container 200. To avoid complexity in FIG. 4, the light flux of the reflected light which is reflected by the surface of the workpiece 5 and returns to the machining head (the reflected light 122 shown in FIG. 3) is not illustrated.

As with the second image capturing device 14 in the second embodiment, the second image capturing device 14 is disposed so that the image capturing surface 142 faces toward the wavelength selective mirror 24B. A dichroic mirror 26 configured to reflect only the light in the wavelength range of the laser beam 12 and to transmit the light in other wavelength range is disposed between the converging lens 143 configured to converge light on the image capturing surface 142 of the second image capturing device 14 and the wavelength selective mirror 24B. The dichroic mirror 26 is disposed substantially at 45 degrees with respect to the light flux of the laser beam 121 which is reflected by the wavelength selective mirror 24B toward the image capturing surface 142 of the second image capturing device 14. The first image capturing device 13 is disposed so as to make incident on the image capturing surface 132, the laser beam 121 which is reflected by the wavelength selective mirror 24B and further reflected by the dichroic mirror 26.

The configuration allows the minimal laser beam 121 which is emitted from the termination surface 41 of the optical fiber 4, reflected by the wavelength selective mirror 24B and reflected by the dichroic mirror 26, to be made incident on the image capturing surface 132 of the first image capturing device 13. The converging lens 133 of the first image capturing device 13 is, as in the first embodiment, configured to irradiate the image capturing surface 132 with the laser beam 121 in a spread state, without condensing the laser beam 121 on one point of the image capturing surface 132. On the other hand, the radiant light 123 coming from the laser beam introduction side inner wall 202 and the like of the machining head body container 200, as in the second embodiment, is reflected by the wavelength selective mirror 24B, transmitted through the dichroic mirror 26, and emitted on the image capturing surface 142 of the second image capturing device 14. The image data captured respectively by the first image capturing device 13 and the second image capturing device 14, as in the first and second embodiments, is output to the image processing circuit 35 of the laser device 3, so that the image determination circuit 36 determines the presence or absence of abnormality in the image data, respectively.

Accordingly, the laser machining system 1 in the present embodiment is capable of producing the effects of both of the first embodiment and the second embodiment. That is, in the case where the output light is reduced due to the abnormality occurring in the laser optical system during the laser machining, the laser machining system 1 in the present embodiment is capable of not only promptly detecting abnormality and thereby preventing the optical system from being damaged and the damage from being expanded, but also capable of detecting minor abnormality with not much variation in the light quantity in the laser optical system, caused due to the eccentricity of the optical fiber 4 in an optical fiber connector part, the excessive curving of the optical fiber 4, the optical axis deviation of the case where a fiber coupler or a fiber selector is disposed in the middle of the optical fiber 4 or other cause, before the laser optical system is damaged, and thereby preventing the damage. Moreover, the laser machining system 1 in the present embodiment is capable of preventing the machining head 2 from being damaged, by detecting the abnormality in which, during the laser machining, the reflected light causes the temperature rise of the laser beam introduction side inner wall 202 of the machining head body container 200, and thus the radiant light 123 is increased.

Fourth Embodiment

Figure 5:
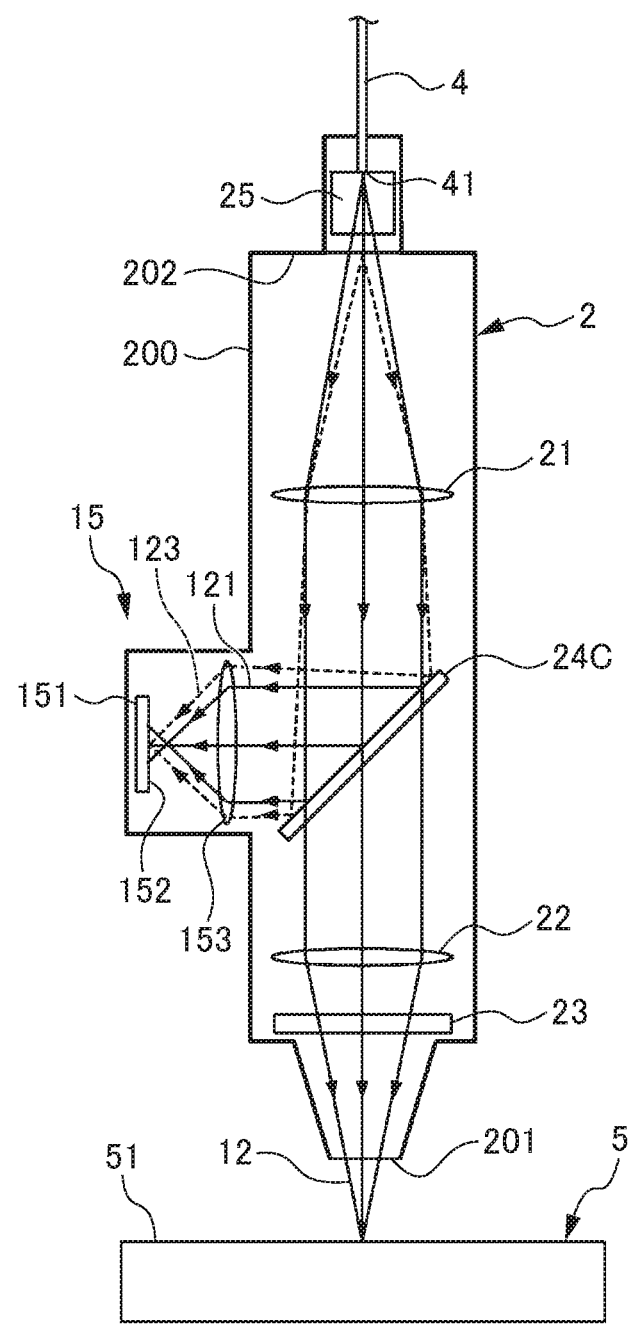
FIG. 5 is a schematic cross-sectional view of a machining head included in a laser machining system according to a fourth embodiment.

FIG. 5 is a schematic cross-sectional view of a machining head included in a laser machining system according to a fourth embodiment. The laser machining system 1 in the present embodiment has a wavelength selective mirror 24C between the collimating lens 21 and the condenser lens 22 disposed in the machining head 2. As in the case of the second embodiment, the wavelength selective mirror 24C shall be the mirror which, as optical characteristics, transmits at least 99% of the light having the wavelength of the laser beam 12 and reflects only a minimal part thereof, and which reflects, at high reflectivity, for example, 50% or higher, the light having a different wavelength from the wavelength of the laser beam 12, for example, the light having a first wavelength and the light having a second wavelength to be described below.

In FIG. 5, as in FIG. 4, each of the solid lines with arrows in the machining head 2 schematically indicates the light flux of the laser beam 12 emitted from the termination surface 41 of the optical fiber 4 or the laser beam 121 generated when a part of the laser beam 12 is reflected by the wavelength selective mirror 24C. Each of the dashed lines with arrows schematically indicates the light flux of the radiant light 123 coming from the laser beam introduction side inner wall 202 and the like of the machining head body container 200. To avoid complexity in FIG. 5, the light flux of the reflected light generated when the laser beam 12 is reflected by the surface of the workpiece 5 and returns to the machining head 2 (the reflected light 122 shown in FIG. 3) is not illustrated.

The machining head 2 in the present embodiment includes a first color image capturing device 15, in place of the two image capturing devices of the first image capturing device 13 and the second image capturing device 14 in the third embodiment. The "color image capturing device" herein corresponds to the image capturing device configured by combining a converging lens 153 and a solid-state image capturing element 151 such as a CCD image sensor or a CMOS image sensor having an image capturing surface 152 on which the pixels in sets respectively having different sensitivity to the light having different wavelengths are arranged two-dimensionally. The color image capturing device is produced in the manner that the dielectric thin films having different refractive indexes are layered to form a multilayer film on the surface of the light receiving parts (photodiodes) of the solid-state image capturing element 151, so as to have sensitivity dependent on wavelengths.

The first color image capturing device 15 included in the machining head 2 in the present embodiment includes the image capturing surface 152 having the pixels having sensitivity to the light having the wavelength of the laser beam 12, and the pixels having sensitivity to the visible light or the light in near infrared region having a different wavelength from the wavelength of the laser beam 12. In the present embodiment, as a preferred example in which the laser beam 12 has the wavelength of approx. 1.1 μm, the image capturing surface 152 includes, as for the pixels having sensitivity to the visible light or the light in near infrared region having a different wavelength from the wavelength of the laser beam 12, specifically, the pixels having the highest sensitivity to the light in near infrared region having the wavelength of 2.5 μm and the wavelength in its vicinity as the light having the first wavelength, and the pixels having the highest sensitivity to the light in near infrared region having the wavelength of 1.8 μm and the wavelength in its vicinity as the light having the second wavelength. As will be described below, the first color image capturing device 15 is intended to acquire the temperature distribution image of the surface of an image capturing object, with these pixels having sensitivity to the light having a different wavelength from the wavelength of the laser beam 12.

The following is the reason why the first color image capturing device 15 includes such pixels having high sensitivity to the wavelengths as described above. The wavelength spectrum of the radiant light emitted from the surface of an object varies according to Planck's law. However, unless the temperature of the surface of an image capturing object increases considerably, the radiant light in the visible wavelength region having the wavelength of 0.8 μm or less is hardly emitted, and thus the temperature distribution image is not able to be acquired. Only in this regard, the pixel having high sensitivity to infrared light having a long wavelength as much as possible of 12 μm or less shall be used. However, the pixel (photodiode) having high sensitivity to the light in infrared region having a wavelength longer than 2.5 μm requires a narrow-gap semiconductor formed from InSb, HgCdTe or the like. Such a pixel, when used, is generally cooled close to a liquid nitrogen temperature in order to reduce thermal noise. This leads to cost increase and upsizing of the image capturing device.

In addition, the optical material for the lens and the like for transmitting infrared light is limited to Si, Ge, etc. Thus, the optical system is also increased in cost. For example, in the case of focusing on the performance rather than the cost, the image capturing device having sensitivity to infrared light having a long wavelength may be selected naturally. On the other hand, the wavelength of 2.5 μm corresponding to the first wavelength described above is close to the limit of the longer wavelength side in the wavelength range for the highest transmittance which the quartz used in the lens and the like can provide, and also close to the response limit of the longer wavelength side of InGaAs photodiode available in a normal temperature. That is, as for the first wavelength, the wavelength of 2.5 μm is selected as the limit of the wavelength in the long wavelength side in the range not leading to large increase in cost nor upsizing of the transmitting optical system such as a lens and the image capturing device.

Alternatively, only on the basis of the light quantity distribution appearing on the image capturing surface of the image capturing device in terms of the light having the first wavelength of 2.5 μm, the temperature distribution image of the image capturing device is able to be acquired naturally. As described above, the wavelength spectrum of the radiant light emitted from the surface of an object varies according to Planck's law. Therefore, in some cases, the method of detecting the temperature rise on the basis of change in intensity ratio of the two wavelengths or more of radiant light separated from one another by a certain level may achieve more accurate detection of temperature rise than the method of detecting temperature rise only on the basis of the increase of one wavelength of radiant light. This is because the former method is hardly affected by the change in transmittance in the middle of the optical system leading from the image capturing object to the image capturing device, as an example. Therefore, taking into consideration the high possibility of being affected by a scattered laser beam or the like of the case of the wavelength thereof close to the wavelength of the laser beam, the wavelength of 1.8 μm is set as the second wavelength, as the middle wavelength between the wavelength of 1.1 μm of the laser beam 12 and the wavelength of 2.5 μm of the first wavelength. That is, the first color image capturing device 15 shall include a plurality of sets of the solid-state image capturing elements 151 arranged two-dimensionally, each set of which includes three pixels respectively having high sensitivity to three wavelengths of 1.1 μm, 1.8 μm and 2.5 μm.

Not only in the present embodiment, in any case where the temperature distribution image of the surface of an image capturing object is intended to be acquired, the image capturing device including the pixels having high sensitivity respectively to the above-described wavelengths of 1.8 μm and 2.5 μm shall be used. As for the second image capturing device 14 in the second and third embodiments, the second image capturing device 14 is intended to detect the radiant light 123 coming from the laser beam introduction side inner wall 202 and the like of the machining head body container 200, and thereby to detect the temperature rise of the portion, and thus the image capturing device including the pixels described above shall be used. It is noted that any of the wavelengths described above is indicated merely as a preferable example, and the present embodiment is not limited to these wavelengths. Further, as described above, the temperature distribution image of the surface of an image capturing object may be acquired by detecting just one wavelength of near infrared light out of the infrared light radiated from the surface of the image capturing object.

As indicated by the light fluxes shown in FIG. 5, the most part of the laser beam 12 emitted from the termination surface 41 of the optical fiber 4 connected to the machining head 2 is transmitted through the wavelength selective mirror 24C and further through the protective window 23, and is emitted so as to be converged on the machining surface 51 of the workpiece 5, whereby the laser machining is carried out. On the other hand, the minimal laser beam 121 which is emitted from the termination surface 41 of the optical fiber 4 connected to the machining head 2 and reflected by the wavelength selective mirror 24C is made incident to the first color image capturing device 15.

The laser beam 121 made incident to the first color image capturing device 15 is detected by the pixels having sensitivity to the light having the wavelength of the laser beam 12 out of the pixels arranged on the image capturing surface 152 of the first color image capturing device 15. The present embodiment is configured so that the laser beam 121 is emitted in a spread state on the image capturing surface 152 of the first color image capturing device 15, not being condensed on one point of the image capturing surface 152. Therefore, the laser beam 121 emitted on the image capturing surface 152 is detected by the plurality of pixels having sensitivity to the light having the wavelength of the laser beam 12, and thereby the image processing circuit 35 acquires the incident light illuminance distribution appearing on the image capturing surface 152 of the first color image capturing device 15. As in the case of the first embodiment, in the case where the displacement between the image output by the image processing circuit 35 and the image acquired by the laser machining system 1 in a normal state is larger than a predetermined range, the image determination circuit 36 determines that abnormality has occurred in the laser optical system leading from the laser oscillator 31 to the machining head 2, and outputs the determination result to the control circuit 33. In response to the determination result by the image determination circuit 36, the control circuit 33 issues, for example, the command to stop laser oscillation to the laser oscillator 31.

On the other hand, at least the radiant light 123 coming from the laser beam introduction side inner wall 202 and the like of the machining head body container 200 is reflected by the wavelength selective mirror 24C, so as to be emitted on the image capturing surface 152 of the first color image capturing device 15. The radiant light 123 emitted on the image capturing surface 152 is detected by, out of the pixels arranged on the image capturing surface 152, the pixels having sensitivity to the light having a different wavelength from the wavelength of the laser beam 12, for example as described above, the pixels having sensitivity to the light having the first wavelength and the pixels having sensitivity to the light having the second wavelength, and is converted by the image processing circuit 35 into the image indicating the temperature distribution of the surface of an image capturing object, such as the laser beam introduction side inner wall 202 of the machining head body container 200.

The radiant light 123 coming from the surface of an image capturing object is detected so that the image determination circuit 36 determines the presence or absence of abnormality on the basis of the temperature distribution, and thus excellent sharpness of the image is not required. This eliminates the need of the configuration of the optical system in which the radiant light 123 coming from the surface of an image capturing object is completely focused on the image capturing surface 152 of the first color image capturing device 15. As in the case of the second embodiment, the image determination circuit 36 promptly detects the temperature rise of the image capturing object part, and outputs, in the case of determining that abnormality has occurred, the determination result to the control circuit 33. This allows the control circuit 33 to stop the output of the laser beam and to issue the light output command to reduce the output of the laser beam, thereby enabling to prevent the machining head 2 from being damaged.

That is, with the above-described configuration, one image capturing device (the first color image capturing device 15) not only detects the light quantity of the output of the laser beam and the incident light illuminance distribution appearing on the image capturing surface 152 during the laser machining, and monitors abnormality in the laser optical system all the time, thereby enabling to prevent the optical system from being damaged and the damage from being expanded, but also promptly and sensitively detects the temperature rise of the laser beam introduction side inner wall 202 and the like of the machining head body container 200 caused by the reflected light, thereby enabling to prevent the machining head 2 from being damaged. As a result, the configuration requires a smaller number of the image capturing devices. This allows to simplify the optical system for image capturing, thereby enabling to provide the machining head 2 with lighter weight in a smaller size.

Fifth Embodiment

Figure 6:
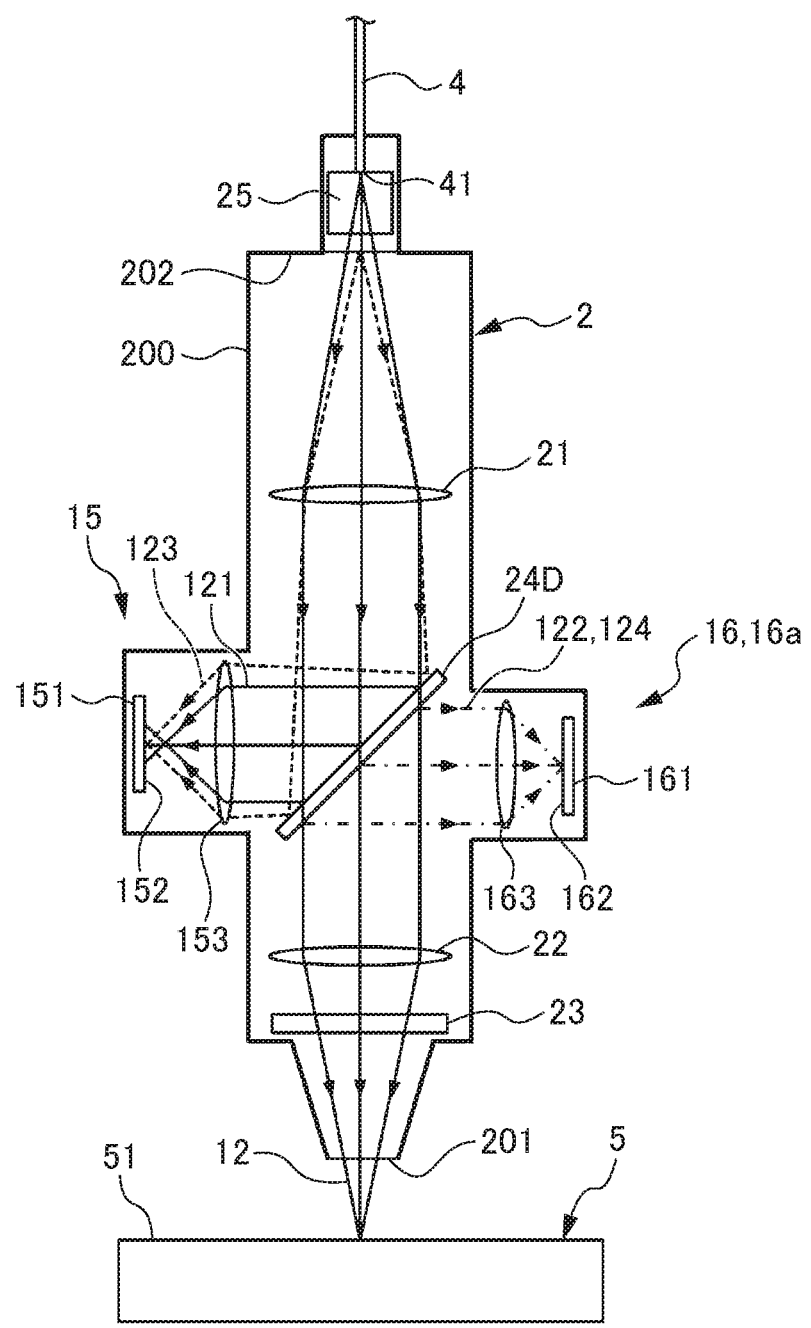
FIG. 6 is a schematic cross-sectional view of a machining head included in a laser machining system according to a fifth embodiment.

FIG. 6 is a schematic cross-sectional view of a machining head included in a laser machining system according to a fifth embodiment. The laser machining system 1 in the present embodiment has, between the collimating lens 21 and the condenser lens 22 in the machining head 2, a wavelength selective mirror 24D. As in the case of the second embodiment, the wavelength selective mirror 24D shall be the mirror which, as optical characteristics, transmits at least 99% of the light having the wavelength of the laser beam 12 and reflects only a minimal part thereof, and which reflects, at high reflectivity, for example, 50% or higher, the light which is visible light or light in near infrared region having a different wavelength from the wavelength of the laser beam 12, specifically, the light in near infrared region to which the pixels of the first image capturing device 15 having sensitivity to a different wavelength from the wavelength of the laser beam have sensitivity, and the visible light or the light in near infrared region to which the pixels of a third image capturing device 16 to be described below or the second color image capturing device having sensitivity to a different wavelength from the wavelength of the laser beam have sensitivity.

The machining head 2 shown in FIG. 6, unlike the machining head 2 shown in FIG. 5, further includes the third image capturing device 16 configured to acquire the image of the machining surface 51 of the workpiece 5, by reflecting the light coming from the machining surface 51 of the workpiece 5 by the wavelength selective mirror 24D. Similarly, the third image capturing device 16 is configured with a solid-state image capturing element 161 such as a CCD image sensor or a CMOS image sensor, and includes an image capturing surface 162 including the pixels having sensitivity to the visible light or the light in near infrared region having a different wavelength from the wavelength of the laser beam 12. In front of the image capturing surface 162, a converging lens 163 is disposed. The wavelength selective mirror 24D is configured to reflect the light coming from the machining surface 51 of the workpiece 5 (the reflected light 122 generated when the laser beam 12 is reflected by the machining surface 51 of the workpiece 5, the radiant light coming from the workpiece 5, a light 124 emitted by lighting equipment and reflected by the machining surface 51 of the workpiece 5), by the surface of the wavelength selective mirror 24D opposite to the surface which reflects the light coming from the side where the laser beam 12 is introduced into the machining head 2, so as to make the reflected light incident on the image capturing surface 162 of the third image capturing device 16. The third image capturing device 16 is configured so that the converging lens 163 condenses the light (the reflected light 122, the light 124) coming from the machining surface 51 of the workpiece 5, on the image capturing surface 162.

The above configuration not only provides the functions and effects described in the fourth embodiment, but also allows the third image capturing device 16 to further acquire the image of the machining surface 51 of the workpiece 5 simultaneously during the laser machining, thereby enabling to monitor the quality of the laser machining state of the workpiece 5 (precision on the machining surface 51, etc.). The image processed by the image processing circuit 35 may be displayed on a display device (not shown).

The third image capturing device 16 may be a second color image capturing device 16a including the pixels having different sensitivity respectively to at least the light having the wavelength of the laser beam 12 and the light having at least one wavelength other than the light having the wavelength of the laser beam 12. In the second color image capturing device 16a, the pixels having high sensitivity to the light having the wavelength of the laser beam 12 detect at least the reflected light 122 which comes from the workpiece 5 and is reflected by the wavelength selective mirror 24D, and the pixels having high sensitivity to the light having at least one wavelength other than the light having the wavelength of the laser beam 12 detect the light 124 which has a different wavelength than that of the laser beam 12, and which comes from the machining surface 51 of the workpiece 5 and is reflected by the wavelength selective mirror 24D so as to be made incident into the second color image capturing device 16a.

In the case where the wavelength selective mirror 24D is configured to transmit 99% or more of the light having the wavelength of the laser beam 12, the light quantity of the reflected light 122 reflected by the wavelength selective mirror 24D and made incident to the third image capturing device 16 or the second color image capturing device 16a is less than 1% of the light quantity of the reflected light 122 emitted to the wavelength selective mirror 24D. Therefore, even when the reflected light 122 is condensed on either of these image capturing surfaces of the image capturing devices, neither of the image capturing devices is damaged. However, in order to prevent the image capturing devices from being damaged, in front of each of the image capturing devices, a filter (not shown) which attenuates the light having the wavelength of the laser beam 12 may be installed.

In FIG. 6, each of the thin solid lines with arrows in the machining head 2 schematically indicates the light flux of the laser beam 12 or the laser beam 121 generated when a part of the laser beam 12 is reflected by the wavelength selective mirror 24D. Each of the dashed lines with arrows schematically indicates the light flux of the radiant light 123 coming from the laser beam introduction side inner wall 202 and the like of the machining head body container 200. Each of the one-dot chain lines with arrows in the machining head 2 schematically indicates the light flux of the light coming from the machining surface 51 of the workpiece 5 including the reflected light 122 and the light 124 coming from the workpiece 5. To avoid complexity in FIG. 6, the light fluxes of the reflected light 122 and the light 124 of the parts returning from the machining surface 51 of the workpiece 5 to the wavelength selective mirror 24D in the machining head 2 are not illustrated.

The machining head 2 reflects the light coming from the machining surface 51 of the workpiece 5 including the reflected light 122 and the light 124 coming from the workpiece 5, by the surface of the wavelength selective mirror 24D opposite to the surface which reflects the light coming from the side where the laser beam 12 is introduced into the machining head 2, to make the reflected light incident to the second color image capturing device 16a, thereby enabling not only to detect the light quantity of the reflected light 122 coming from the workpiece 5 but also to acquire the image of the machining surface 51 of the workpiece 5. Accordingly, the laser machining system 1 including the machining head 2 is capable of monitoring the quality of the laser machining conditions of the workpiece 5 (precision on the machining surface 51, etc.), while monitoring the light quantity of the reflected light 122.

The third image capturing device 16 or the second color image capturing device 16a in the present embodiment detects the reflected light 122 which comes from the workpiece 5 and is reflected by the surface of the wavelength selective mirror 24D opposite to the surface which reflects the light coming from the side where the laser beam 12 is introduced into the machining head 2. This allows the laser machining system 1 to control the laser beam output, by detecting the light quantity of the reflected light 122 during the laser machining substantially at the closest position to the inlet of the reflected light 122 in the laser machining system 1. Accordingly, the laser machining system 1 is effectively prevented from being damaged by the reflected light 122.

It is noted that just monitoring of the light quantity of the reflected light 122 does not necessarily require an image capturing device such as the third image capturing device 16 or the second color image capturing device 16a. In this case, a light sensor may be used, capable of detecting the reflected light 122 by a single pixel having sensitivity to the wavelength of the laser beam 12.

As the pixel having high sensitivity to the light having at least one wavelength other than the light having the wavelength of the laser beam 12, the pixel having sensitivity to normal visible light may be used to check the shape of the workpiece 5 under machining, the pixel having sensitivity to the plasma light generated during the laser machining may be used, or alternatively the pixel having sensitivity to near infrared light may be used to acquire the temperature distribution image in the vicinity of the machining point of the workpiece 5. A plurality of pixels with different wavelength response may be arranged on the image capturing surface of a solid-state image capturing device. In an example, the pixels of the third image capturing device 16 or the second color image capturing device 16a to respond merely to the light having a wavelength shorter than the wavelength of 1.1 µm of the laser beam 12 may be configured with Si photodiodes with the cutoff wavelength in the long wavelength side of 1.1 µm.

Conversely, in the case where the second color image capturing device 16a includes, as with the first color image capturing device 15, the pixels having sensitivity to the light having at least two different wavelengths in near infrared region, the laser machining system 1 may be configured to calculate the temperature of the protective window 23 of the machining head 2 just before the stop of the laser beam emission, on the basis of the time series data of the light quantities of the light having at least two wavelengths having been detected by the second color image capturing device 16a since just after the stop of the laser beam emission.

In this case, a calculation circuit may be separately configured to calculate the temperature of the protective window 23 just before the stop of the laser beam emission, or alternatively the image processing circuit 35 may include the function. The focal point of the second color image capturing device 16a is adjusted on the machining surface 51 of the workpiece 5, and the protective window 23 is thus subjected to image capturing under the state of being out of focus. However, since the light quantity of the radiant light coming from the protective window 23 is detectable, the temperature of the protective window 23 just before the stop of the laser beam emission is able to be easily calculated, on the basis of the time series data indicating the attenuation of the respective light quantities of the light having at least two wavelengths due to the radiation from the protective window 23 since just after the stop of the laser beam emission, in the following formula. As a result of the calculation, it is estimated that the absorptivity of the protective window 23 to the laser beam is increased due to a stain or the like on the protective window 23 because the calculated temperature is increased.

This notifies a user of the maintenance timing of the protective window 23.

$$dCT(t)/dt = -T(t)/R \quad \text{(Formula 1)}$$

Herein, C denotes a heat capacity (J/K) of the protective window 23, T(t) denotes a temperature rise (K) of the protective window 23 from the thermal equilibrium state thereof, serving as a function of time, and R denotes a thermal resistance (K/W) relative to heat dissipation. Formula 1 represents the relation that the amount of reduction of the heat accumulated in the protective window 23 is equal to the amount of heat dissipation from the protective window 23 through the thermal resistance. The solution to the differential equation of Formula 1 is easily obtained, as in Formula 2.

$$T(t) = T_0 \times \exp\{-t/(CR)\} \quad \text{(Formula 2)}$$

Herein, $T_0$ denotes the temperature rise at t=0, and means the temperature rise of the protective window 23 just before the stop of the laser beam emission. According to Formula 2, in an example, when $T_1$ denotes the temperature rise of the protective window 23 at the time when one second elapses after the stop of the laser beam emission, and $T_2$ denotes the temperature rise of the protective window 23 at the time when two seconds elapse, the temperature rise of the protective window 23 just before the stop of the laser beam emission is obtained as $T_0 = (T_1)^2/T_2$.

In order to reduce the influence of the radiant light coming from the machining point of the workpiece 5 where the temperature is increased, the machining head 2 shall be moved from the machining point of the workpiece 5 just after the stop of the laser beam emission, and thereafter the time series data described above shall be acquired. The light quantity of the radiant light made incident due to other background is able to be estimated on the basis of the value detected when the temperature of the protective window 23 returns to room temperature. Therefore, the increase in the light quantity of the radiant light due to the temperature rise of the protective window 23 caused by the emission of the laser beam 12 is able to be calculated. In the case where the calculated temperature of the protective window 23 just before the stop of the laser beam emission exceeds a predetermined temperature, the image determination circuit 36 outputs the result to the control circuit 33. In response to the result from the image determination circuit 36 that the temperature has exceeded a predetermined temperature, the control circuit 33 may display a warning for prompting a user to clean or replace the protective window 23, on a display device (not shown) of the laser device 3 or the like.

Sixth Embodiment

Figure 7:
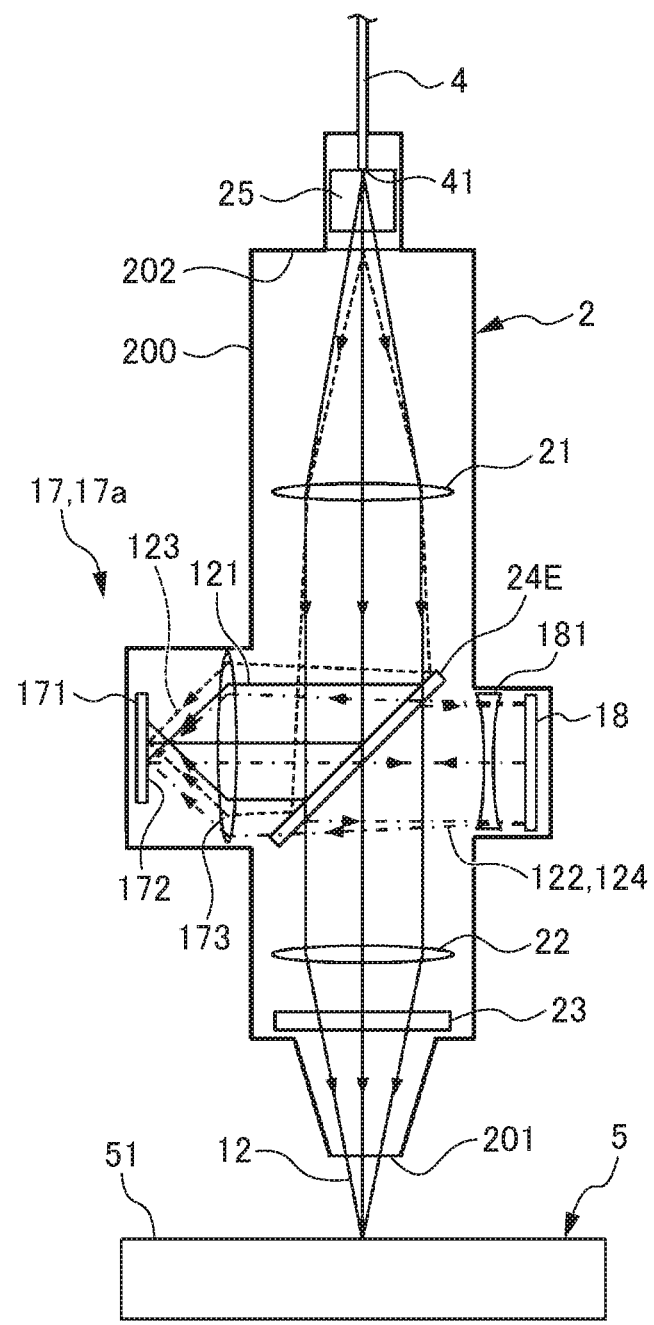
FIG. 7 is a schematic cross-sectional view of a machining head included in a laser machining system according to a sixth embodiment.

FIG. 7 is a schematic cross-sectional view of a machining head included in a laser machining system according to a sixth embodiment. The laser machining system 1 in the present embodiment has, between the collimating lens 21 and the condenser lens 22 provided in the machining head 2, a wavelength selective mirror 24E. As in the case of the second embodiment, the wavelength selective mirror 24E shall be the mirror which, as optical characteristics, transmits at least 99% of the light having the wavelength of the laser beam 12 and reflects only a minimal part thereof, and which reflects at the reflectivity of approx. 50% and transmits at the transmittance of approx. 50% (=transmittance ($\approx$1)-reflectivity), the light having the wavelength to which the pixels of a fourth image capturing device 17 or a third color image capturing device to be described below having sensitivity to a different wavelength from the wavelength of the laser beam 12 have sensitivity.

In FIG. 7, as in FIG. 6, each of the thin solid lines with arrows in the machining head 2 schematically indicates the light flux of the laser beam 12 or the laser beam 121 generated when a part of the laser beam 12 is reflected by the wavelength selective mirror 24E. Each of the dashed lines with arrows schematically indicates the light flux of the radiant light 123 coming from the laser beam introduction side inner wall 202 and the like of the machining head body container 200. Each of the one-dot chain lines with arrows schematically indicates the light flux of the light coming from the machining surface 51 of the workpiece 5 including the reflected light 122 and the light 124 coming from the workpiece 5. To avoid complexity in FIG. 7, the light fluxes of the reflected light 122 and the light 124 of the parts returning from the machining surface 51 of the workpiece 5 to the machining head 2 are not illustrated.

The machining head 2 in the present embodiment includes the fourth image capturing device 17 including the pixels having sensitivity to the light having at least one wavelength other than the wavelength of the laser beam 12, and a reflectivity variable device 18 capable of varying reflectivity. The fourth image capturing device 17 and the reflectivity variable device 18 are arranged so as to surface each other across the wavelength selective mirror 24E.

The fourth image capturing device 17 is configured with a solid-state image capturing element 171 such as a CCD image sensor or an CMOS image sensor, and includes an image capturing surface 172 including the pixels having sensitivity to the light having at least one wavelength other than the wavelength of the laser beam 12. In front of the image capturing surface 172, a converging lens 173 is arranged.

The reflectivity variable device 18 shall be the mirror device which allows to lower the reflectivity down to approx zero. As the reflectivity variable device 18, a digital mirror device, a liquid crystal panel, a light control mirror device, a reflector with shutter and the like are available. Particularly, a digital mirror device or a liquid crystal panel shall be used among these devices, in order to provide the machining head 2 with lighter weight in a smaller size. The reflectivity variable device 18 shall be a device capable of varying the reflectivity repeatedly and speedily.

In front of the reflectivity variable device 18, a concave lens 181 is arranged. The concave lens 181 is configured so that the light coming from the machining surface 51 of the workpiece 5 including the reflected light 122 and the light 124 which comes from the workpiece 5, is reflected by the wavelength selective mirror 24E and the reflectivity variable device 18, and thereafter transmitted through the wavelength selective mirror 24E to be made incident to the fourth image capturing device 17, is converged on the image capturing surface 172, as with the radiant light 123 coming from the laser beam introduction side inner wall 202 and the like of the machining head body container 200 (unlike the laser beam 121 which is reflected by the wavelength selective mirror 24E so as not to be converged on the image capturing surface 172)

When the reflectivity of the reflectivity variable device 18 is substantially zero, each pixel of the fourth image capturing device 17 having sensitivity to the light having a wavelength other than the wavelength of the laser beam 12 detects the radiant light 123 which comes from the laser beam introduction side inner wall 202 and the like of the machining head body container 200 and is reflected by the wavelength selective mirror 24E. Accordingly, the fourth image capturing device 17 is able to acquire the image of the laser beam introduction side inner wall 202 and the like of the machining head body container 200. When the reflectivity of the reflectivity variable device 18 is not zero, each pixel of the fourth image capturing device 17 having sensitivity to the light having a wavelength other than the wavelength of the laser beam 12 detects also the light 124 coming from the workpiece 5 (the light emitted by lighting equipment and the like and reflected by the machining surface 51 of the workpiece 5, and the light emitted from the machining surface 51 of the workpiece 5), under being superimposed on the radiant light 123 emitted from the laser beam introduction side inner wall 202 and the like of the machining head body container 200. The light 124 coming from the workpiece 5 is reflected by the wavelength selective mirror 24E and the reflectivity variable device 18 in this order, and thereafter transmitted through the wavelength selective mirror 24E so as to be made incident to the fourth image capturing device 17.

The light quantity of the light which is reflected by the machining surface 51 of the workpiece 5 or emitted from the machining surface 51 of the workpiece 5 so as to be made incident into each pixel of the fourth image capturing device 17 is obtained, by subtracting the light quantity detected by the fourth image capturing device 17 at the time when the reflectivity of the reflectivity variable device 18 is substantially zero, from the light quantity detected by the fourth image capturing device 17 at the time when the reflectivity of the reflectivity variable device 18 is not zero. This allows the fourth image capturing device 17 to acquire the image of the machining surface 51 of the workpiece 5. Since the image of the laser beam introduction side inner wall 202 and the like of the machining head body container 200 is expected to be acquired as a temperature distribution image, respective pixels of the fourth image capturing device 17 having sensitivity to the light having a wavelength other than the wavelength of the laser beam 12 shall include the pixel having sensitivity to the wavelength in near infrared region, as in the description in terms of the fourth embodiment.

As described above, the configuration with the reflectivity variable device 18 capable of varying the reflectivity thereof allows one image capturing device (the fourth image capturing device 17) to acquire, during the laser machining, the temperature distribution image of the laser beam introduction side inner wall 202 and the like of the machining head body container 200 and the infrared image of the machining surface 51 of the workpiece 5. This enables to promptly and sensitively detect the temperature rise of the laser beam introduction side inner wall 202 and the like of the machining head body container 200 due to the reflected light 122 not returning to the termination surface 41 (the laser beam emitting end) of the optical fiber 4 during the laser machining, and further enables to monitor the quality of the laser machining state of the workpiece 5. The fourth image capturing device 17 configured further with the pixels having sensitivity to visible light is capable of acquiring the visible image of the machining surface 51 of the workpiece 5. As compared to the fifth embodiment, the machining head 2 in the present embodiment includes a smaller number of the image capturing devices, and thus the optical system for image capturing has a simpler configuration. This allows to provide the machining head 2 with lighter weight in a smaller size.

The fourth image capturing device 17 may be a third color image capturing device 17a including the pixels having different sensitivity respectively to at least the light having the wavelength of the laser beam 12 and the light having at least one wavelength other than the wavelength of the laser beam 12. In this case, when the reflectivity of the reflectivity variable device 18 is substantially zero, each pixel of the third color image capturing device 17a having sensitivity to the light having the wavelength of the laser beam 12 detects the laser beam 121 which is emitted from the termination surface 41 of the optical fiber 4 connected to the machining head 2, reflected by the wavelength selective mirror 24E, and emitted on the image capturing surface 172 in a spread state. Each pixel of the third color image capturing device 17a having sensitivity to the light having a wavelength in near infrared region other than the wavelength of the laser beam 12 detects the radiant light 123 emitted from the laser beam introduction side inner wall 202 and the like of the machining head body container 200. As a result, the incident light illuminance distribution appearing on the image capturing surface 172 of the third color image capturing device 17a is acquired on the basis of the output of the pixels having sensitivity to the light having the wavelength of the laser beam 12, and the infrared image (the temperature distribution image) of the laser beam introduction side inner wall 202 and the like of the machining head body container 200 is acquired on the basis of the output of the pixels having sensitivity to the light having a wavelength in near infrared region other than the wavelength of the laser beam 12.

When the reflectivity of the reflectivity variable device 18 is not zero, each pixel of the third color image capturing device 17a having sensitivity to the light having the wavelength of the laser beam 12 detects the laser beam 121 which is emitted from the termination surface 41 of the optical fiber 4, reflected by the wavelength selective mirror 24E, and emitted on the image capturing surface 172 in a spread state, and further detects the reflected light 122 which comes from the machining surface 51 of the workpiece 5, is reflected by the wavelength selective mirror 24E and the reflectivity variable device 18 in this order, and is transmitted through the wavelength selective mirror 24E, so as to be made incident to the third color image capturing device 17a. Each pixel of the third color image capturing device 17a having sensitivity to the light having a wavelength other than the wavelength of the laser beam 12 detects the light in near infrared region emitted from the laser beam introduction side inner wall 202 and the like of the machining head body container 200, and further detects the light 124 (the light emitted by lighting equipment or the like and reflected by the machining surface 51 of the workpiece 5, and the light emitted from the machining surface 51 of the workpiece 5) which comes from the machining surface 51 of the workpiece 5, is reflected by the wavelength selective mirror 24E and the reflectivity variable device 18 in this order, and transmitted through the wavelength selective mirror 24E so as to be made incident to the third color image capturing device 17a. The light 124 coming from the workpiece 5 is reflected by the wavelength selective mirror 24E and reflected by the reflectivity variable device 18, and is thereafter transmitted through again the wavelength selective mirror 24E so as to be made incident to the third color image capturing device 17a. This attenuates the light by the quantity obtained by multiplying the reflectivity by the transmittance of the wavelength selective mirror 24E in terms of the light having the wavelength. Therefore, the wavelength selective mirror shall satisfy, as for the light having a wavelength to which each pixel having sensitivity to the light having a wavelength other than the wavelength of the laser beam 12 has sensitivity, the optical condition in which the value obtained in the formula of reflectivity x (1-reflectivity) led from the relation of transmittance≈1-reflectivity is maximized, that is, the optical condition of reflectivity transmittance≈50%.

As for any of the pixels of the third color image capturing device 17a having sensitivity to the light having the wavelength of the laser beam 12 and the pixels having sensitivity to the light having a wavelength other than the wavelength of the laser beam 12, the light quantity detected by each pixel of the light which is reflected by the reflectivity variable device 18 so as to be made incident to the third color image capturing device 17a is able to be calculated, by subtracting the light quantity detected by the third color image capturing device 17a at the time when the reflectivity of the reflectivity variable device 18 is substantially zero, from the light quantity detected by the third color image capturing device 17a at the time when the reflectivity of the reflectivity variable device 18 is not zero. Accordingly, the pixels having sensitivity to the light having the wavelength of the laser beam 12 are capable of calculating the light quantity of the reflected light 122 coming from the machining surface 51 of the workpiece 5, and the pixels having sensitivity to the light having a wavelength other than the wavelength of the laser beam 12 are capable of acquiring the image of the machining surface 51 of the workpiece 5.

As described above, the machining head 2 in the present embodiment includes the reflectivity variable device 18 capable of varying the reflectivity thereof. Accordingly, the machining head 2 including one color image capturing device (the third color image capturing device 17a), as in the case of the machining head 2 in the fifth embodiment including two image capturing devices, is capable of detecting the light quantity of the output laser beam and the incident light illuminance distribution appearing on the image capturing surface 172, and promptly and sensitively detecting the temperature rise of the laser beam introduction side inner wall 202 and the like of the machining head body container 200 due to the reflected light 122 which does not return to the termination surface 41 (laser beam emitting end) of the optical fiber 4 during the laser machining, and is further capable of not only detecting the light quantity of the reflected light 122 coming from the workpiece 5, but also acquiring the image of the machining surface 51 of the workpiece 5. Therefore, the machining head 2 in the present embodiment includes a smaller number of the color image capturing devices, and thus the optical system for image capturing has a simpler configuration. This allows to provide the machining head 2 with lighter weight in a smaller size.

Seventh Embodiment

Figure 8:
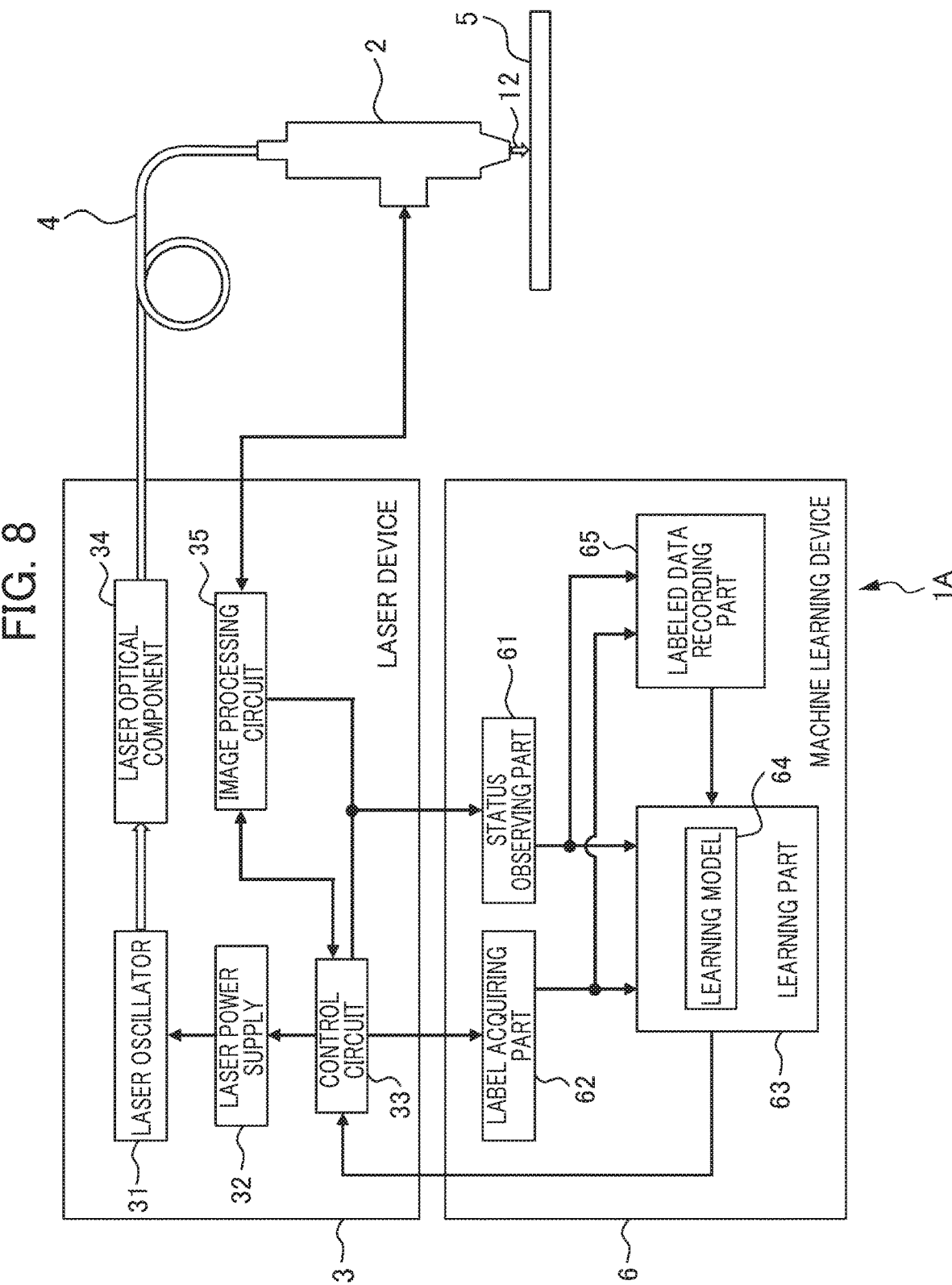
FIG. 8 is a block diagram illustrating a configuration in a conceptual manner of a laser machining system according to a seventh embodiment.

FIG. 8 is a block diagram illustrating a configuration in a conceptual manner of a laser machining system according to a seventh embodiment. As in FIG. 1, each of the arrows in thick solid lines schematically indicates the signal line and the like, and the direction thereof. A laser machining system 1A in the present embodiment further includes a machine learning device 6 communicably connected to the laser device 3. It is noted that the laser device 3 in the present embodiment does not include the image determination circuit 36.

The machine learning device 6 acquires, as input data through a status observing part 61, at least the light output command data output by the control circuit 33 of the laser device 3 to the laser oscillator 31, and the data of incident light illuminance distribution of the output laser beam acquired by the image processing circuit 35 and any one of the first image capturing device 13, the first color image capturing device 15, the fourth image capturing device 17, and the third color image capturing device 17a. The machine learning device 6 further acquires, as a label through a label acquiring part 62, the evaluation value indicating whether the laser optical system leading from the laser oscillator 31 to the machining head 2 is in a normal state or an abnormal state. The machine learning device 6 prepares the input data and the labels in pairs as teacher data, and a learning part 63 learns the relation between the input data and the labels by use of the many samples in pairs by the supervised learning, and builds a learning model 64. The learning part 63 outputs, as a prediction value, a prediction result in terms of presence or absence of abnormality in the laser optical system leading from the laser oscillator 31 to the machining head 2, with respect to new input data including at least the light output command data and the data of incident light illuminance distribution using the learning model 64.

In the case where the learning part 63 outputs the prediction result indicating the occurrence of abnormality in the laser optical system, the machine learning device 6 outputs the prediction result to the control circuit 33 of the laser device 3. The control circuit 33, in response to the prediction result, stops or reduces the laser beam to be output by the laser device 3, thereby enabling to prevent the laser optical system from being damaged, and enabling to prevent the damage in the laser optical system from being expanded.

It is noted that, as the evaluation value indicating whether the laser optical system is in a normal state or an abnormal state, the difference between the output laser beam converted from the detection value to the light output command and the input data is used. In the case where the difference between the two is more than mere error in measurement, and where the two ratios differ by a predetermined value or more from 1, it is determined that obvious abnormality has occurred.

The machine learning device 6 shall acquire the data of incident light illuminance distribution, specifically not only the data at the time when the obvious abnormality occurs, but also the data in the form of continuous video up to that time point, and the machine learning part 63 shall learn the characteristics of the input data including the data of incident light illuminance distribution before the occurrence of the obvious abnormality, so as to be able to output, as a prediction value for new input data including the data of incident light illuminance distribution, the prediction result indicating that minor abnormality before the occurrence of obvious abnormality may have occurred.

The control circuit 33 receives, from the machine learning device 6, the prediction result indicating that minor abnormality may have occurred, switches laser drive conditions, and outputs a command to reduce or stop the light output or another command to the laser power supply 32. In the case of very minor abnormality, the control circuit 33 may merely display warning on a display device (not shown), without switching the laser drive conditions, so as to prevent the occurrence of defect in the laser machining. It is noted that, as for the output laser beam converted from the above detection value, the light quantities converted from the detection values of the incident light illuminance distribution detected by respective pixels may be totalized for use, or alternatively the detection result by the output light sensor (not shown) disposed in a position other than the machining head 2 may be converted for use.

The learning model 64 shown in FIG. 8 means a function for representing a label based on data, and may be the data for defining the operation to be executed by a neuron in each layer of a neural network, the data representing a support vector of a support vector machine, or other data. The learning part 63 includes not only a neural network and a support vector machine, but also an operation circuit, such as a CPU, configured to execute operation processing such as error calculation to be described below required for learning, a memory circuit configured to record programs and data required for calculation, and a communication circuit configured to communicate with the control circuit 33 and respective parts of the machine learning device 6.

To avoid complexity in FIG. 8, any signal line from the learning part 63 to each part of the machine learning device 6 is not illustrated. Each of the status observing part 61 and the label acquiring part 62 in FIG. 8, as with the image processing circuit 35 and the image determination circuit 36 described above, includes an operation circuit configured to acquire input data, process the input data as necessary and output the resultant data to the learning part 63, or to acquire the data required for building the learning model 64 and output the data to the learning part 63, a memory circuit configured to record programs, data and the like required for executing the operation processing, and a communication circuit configured to communicate with respective parts such as the control circuit 33, the image processing circuit 35 and the learning part 63. A labeled data recording part 65 may be a memory circuit, a magnetic recording medium or the like, and may be disposed separately from the machine learning device 6 so as to provide labeled data to the learning part 63 via a memory card, a communication line, or other measure.

Figure 9A:
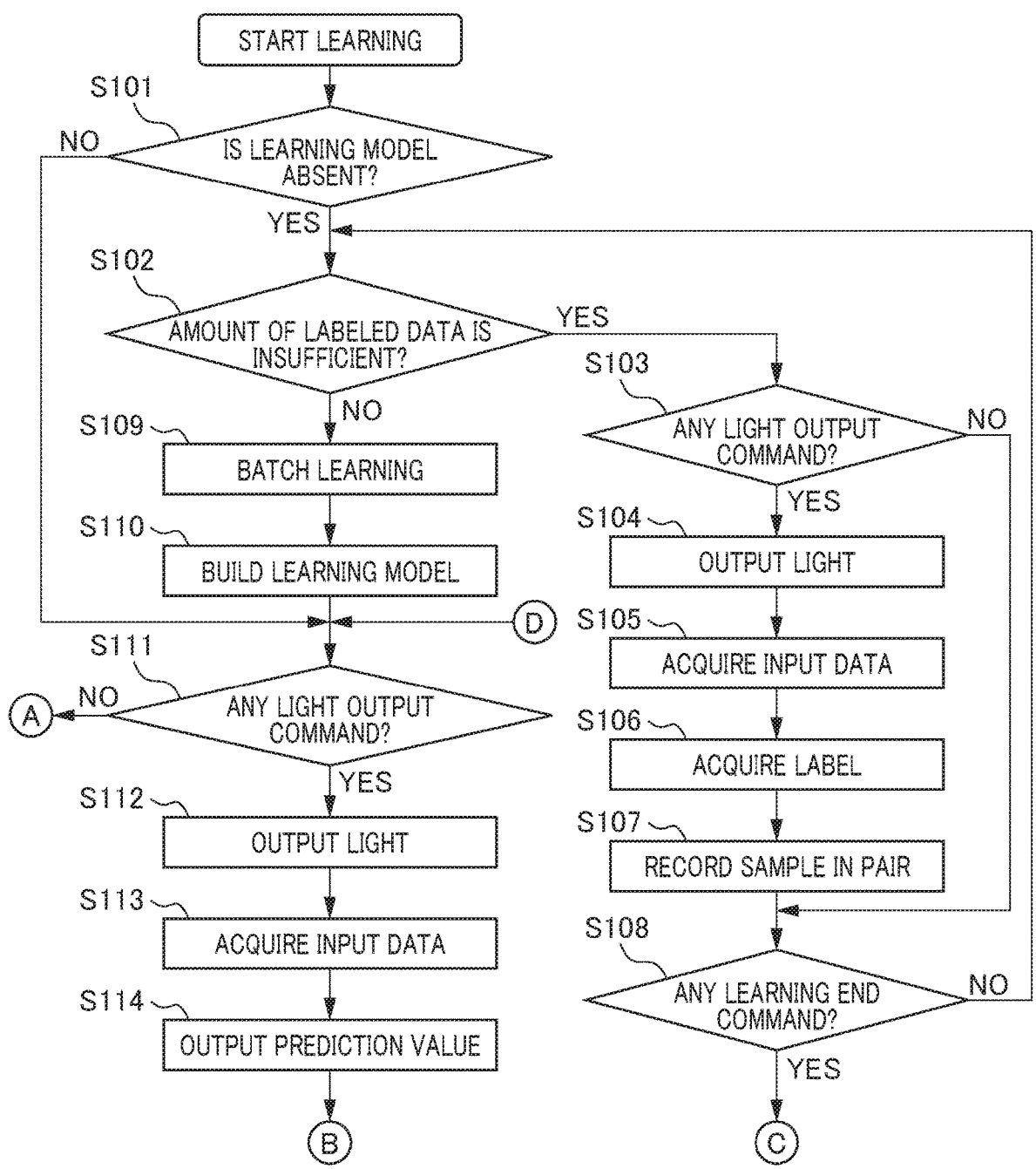
FIG. 9A is a flowchart indicating an example of process of learning by machine learning in the laser machining system according to the seventh embodiment.
Figure 9B:
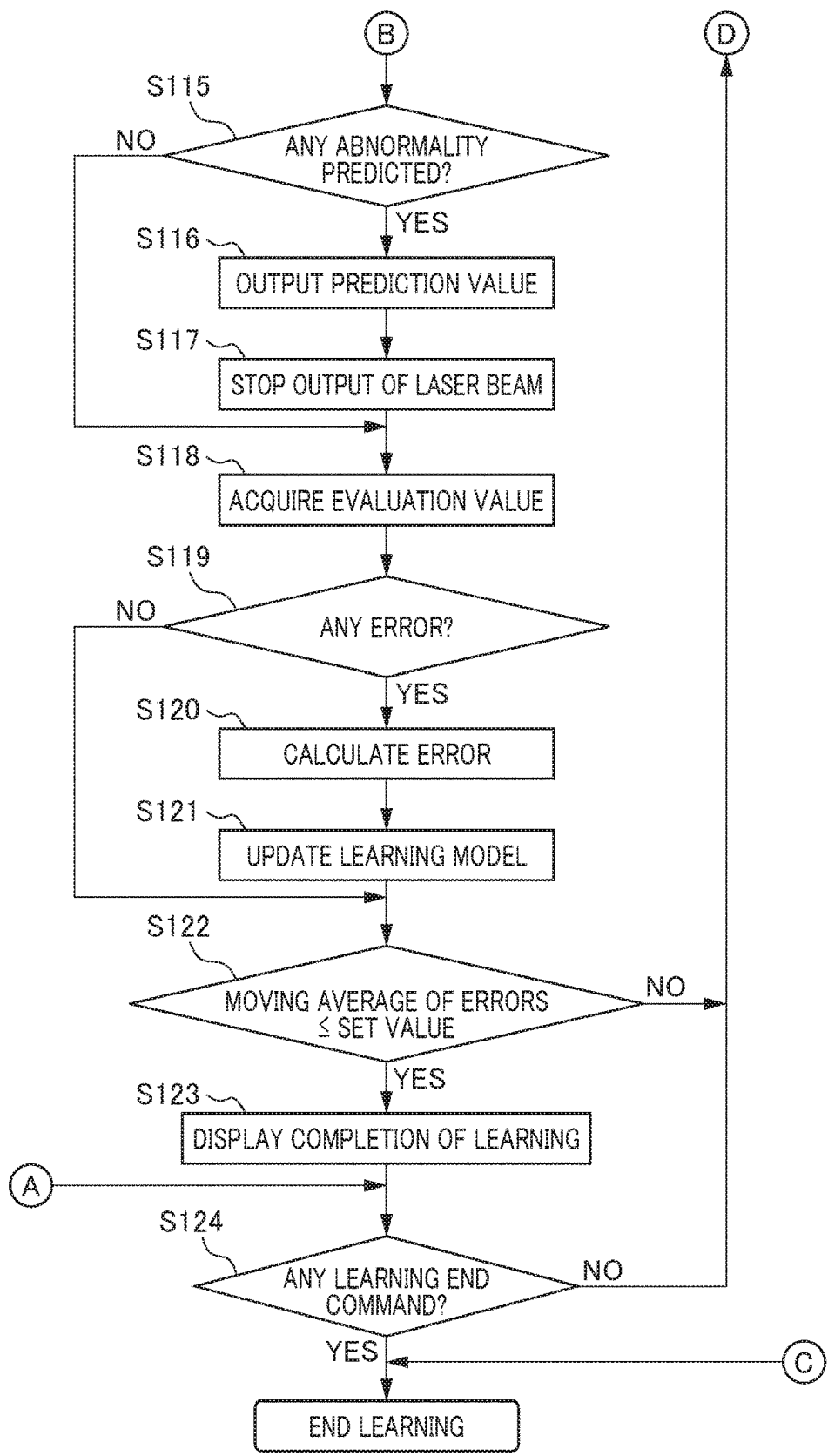
FIG. 9B is another flowchart indicating the example of process of learning by machine learning in the laser machining system according to the seventh embodiment.

Each of FIG. 9A and FIG. 9B is a flowchart indicating the process of learning by machine learning in the laser machining system 1A in the present embodiment. When the learning is started, the machine learning device 6 first determines whether or not the learning model 64 is already present in the learning part 63 (step S101). In the case of determining that the learning model 64 is absent, the machine learning device 6 determines whether or not the amount of the labeled data recorded in the labeled data recording part 65 is insufficient to perform the machine learning by the supervised learning (step S102).

In the case of, in step S102, determining the amount of the labeled data as being insufficient, the machine learning device 6 determines whether or not any light output command is issued by the control circuit 33 (step S103). In the case where the light output command is output by the control circuit 33, a laser beam is output (step S104). Therefore, in synchronization with the output of the laser beam, the learning part 63 acquires, as input data through the status observing part 61, at least the light output command data output by the control circuit 33 to the laser oscillator 31, and the data of the incident light illuminance distribution of the output laser beam appearing on the image capturing surface 132, 152 or 172 acquired by any one of the first image capturing device 13, the first color image capturing device 15, the fourth image capturing device 17 and the third color image capturing device 17a, and the image processing circuit 35 (step S105).

The input data may additionally include the output data by a sensor installed in the laser device 3 or the laser machining system 1A and the like. The status observing part 61 may process the input data, as necessary. In an example, the status observing part 61, which includes the function of the image processing circuit 35, may directly receive the output from the image capturing device and process the data of the incident light illuminance distribution appearing on the image capturing surface 132, 152 or 172 of the image capturing device. It is noted that the machine learning device 6 shall acquire the data of incident light illuminance distribution in the form of video data, not as sporadic data, and shall acquire internal data of the laser device 3 such as a light output command corresponding to each of the data of incident light illuminance distribution, or the data output by a sensor.

The machine learning device 6 then acquires, through the label acquiring part 62, the evaluation value indicating whether the laser optical system leading from the laser oscillator 31 to the machining head 2 is in a normal state or an abnormal state, with respect to each of the input data including the data of incident light illuminance distribution as a label (step S106). It is noted that, as the evaluation value indicating whether the laser optical system is in a normal state or an abnormal state, described above, the difference between the output laser beam converted from the detection value to the light output command and the input data including the data of incident light illuminance distribution is used. In the case where the difference between the two is more than mere error in measurement, and the two ratios differ by a predetermined value or more from 1, the machine learning device 6 determines that obvious abnormality has occurred, and acquires the evaluation value indicating that obvious abnormality has occurred, as a label. In the case of never having determined the occurrence of abnormality since then, the machine learning device 6 acquires the evaluation value indicating no abnormality, as a label. In the case where the machine learning device 6 has never determined the occurrence of obvious abnormality described above up to the time of acquiring input data including the data of incident light illuminance distribution, but determines the occurrence of obvious abnormality just after, for example, 10 milliseconds, the machine learning device 6 acquires the evaluation value indicating 10 milliseconds before the occurrence of obvious abnormality, as a label.

The machine learning device 6 then records the sample in a pair of the input data including the acquired data of incident light illuminance distribution and the corresponding label, into the labeled data recording part 65 (step S107), and determines, in step S108, whether or not any learning end command is issued to the learning part 63 from the outside. In the case where the learning end command is issued for some reason, the machine learning device 6 ends the learning. In the case where any learning end command is not issued, the processing is returned to step S102, and thereby the machine learning device 6 again records the sample in a pair of the input data and the label into the labeled data recording part 65.

In the case where, in step S102, the amount of the labeled data is determined not to be insufficient to perform the machine learning by the supervised learning, the learning part 63 reads the many samples in pairs of the input data and the labels recorded in the labeled data recording part 65, learns the relation between the input data and the labels in batch learning (step S109), and builds the learning model 64 (step S110).

In an example, in order to acquire valid samples in pairs of the input data and the labels for the learning, the optical axis of the laser optical component 34 may be intentionally slightly displaced, or bending stress may be applied to a connector or a fiber and the like. It is noted that, in the case where, in step S103, it is determined that any light output command is not issued by the control circuit 33, the processing proceeds to step S108.

In the present embodiment, after the learning model 64 is built, the machine learning device 6 switches the learning method to online learning, and again determines whether or not any light output command is issued by the control circuit 33 (step S111). It is noted that, in the case where, in step S101, the learning model 64 is determined to be already present, the processing directly proceeds to step S111. When the light output command is output by the control circuit 33, a laser beam is output (step S112). Therefore, in synchronization with the output of the laser beam, the learning part 63 acquires, through the status observing part 61, the input data including the data of incident light illuminance distribution as described above one after another (step S113), and outputs a prediction value corresponding to an evaluation value of a label with respect to each of input data, by using the learning model serving as learning result (step S114). As described above, the machine learning device 6 acquires the data of incident light illuminance distribution included in the input data, specifically not only the data at the time when the obvious abnormality occurs, but also the data in the form of continuous video up to that time point, and learns the characteristics of the input data including the data of incident light illuminance distribution before the occurrence of the obvious abnormality. Therefore, the machine learning device 6 is able to predict the occurrence of minor abnormality before the occurrence of obvious abnormality, with respect to the input data including the data of incident light illuminance distribution before the occurrence of the obvious abnormality. The abnormality in the data of incident light illuminance distribution appears, for example, in the form that the half-value width of the incident light illuminance distribution is changed, a peak position is eccentric or fluctuates, or a plurality of peaks are present.

The machine learning device 6 determines whether or not the prediction value output by the learning part 63 corresponds to the prediction result indicating the occurrence of obvious abnormality, or the occurrence of minor abnormality before the occurrence of obvious abnormality (step S115). In the case where the prediction value corresponds to the prediction result indicating the occurrence of abnormality, the machine learning device 6 outputs the prediction value to the control circuit 33 (step S116). The control circuit 33, in response to the prediction value, outputs the command to reduce or stop the output of the laser beam to the laser power supply 32 (step S117). In the case of very minor abnormality, the control circuit 33 may merely display warning on a display device (not shown), with no change in the output of the laser beam corresponding to the original light output command until the end of a series of laser machining, so as to prevent the occurrence of defect in the laser machining.

Then in step S118, the machine learning device 6 acquires the evaluation value corresponding to the input data, relevant to whether the laser optical system is in a normal state or an abnormal state. In the case where the prediction value indicating the occurrence of abnormality is output, the machine learning device 6 investigates the cause, and the cause needs to be eliminated such as by correcting slight positional deviation of the optical axis of the laser optical component 34 of the cause, or by removing a stain from the laser optical component 34. The machine learning device 6 may add the cause of the occurrence of abnormality found through the investigation, into the label paired with the input data, and may output, in the case of predicting the occurrence of abnormality with respect to the input data including the data of incident light illuminance distribution, the prediction result indicating the cause of the occurrence of abnormality and the location of the occurrence of the abnormality, so that the cause of the occurrence of abnormality is able to be removed promptly. In order to add the cause of the occurrence of abnormality and the location of the occurrence of abnormality into the prediction result, the machine learning device 6 shall add the cause of the occurrence of abnormality and the location of the occurrence of abnormality into the label, when acquiring the label in step S106 described above, even in the case where abnormality is intentionally caused.

In the case where, in step S115, the machine learning device 6 determines that the prediction value output by the learning part 63 corresponds to the absence of abnormality, the processing directly proceeds to step S118. As in step S106 described above, the machine learning device 6 automatically acquires the evaluation value indicating whether the laser optical system is in a normal state or an abnormal state, through the label acquiring part 62. Then, the learning part 63 determines whether or not there is an error between the prediction value and the acquired evaluation value with respect to the input data output by use of the learning model 64 (step S119). In the case where it is determined that there is an error, the machine learning device 6 calculates the error (step S120), and updates the learning model 64 on the basis of the calculated error (step S121).

Then, in order to evaluate the level of learning, the machine learning device 6 compares the moving average value of the errors having been calculated with the set value which is set as a target, and determines whether or not the moving average value of the errors is equal to or smaller than the set value (step S122). In the case of determining that the moving average value of the errors is equal to or smaller than the set value, the machine learning device 6 may display the information indicating the completion of the learning on the display device (not shown) (step S123). In the case where, in step S119, it is determined that there is no error, the processing proceeds directly to step S122. Then, the machine learning device 6 determines whether or not any learning end command is issued through an input device (not shown) or the like, in response to the display of the completion of the learning in step S123 (step S124). In the case where the learning end command is issued, the machine learning device 6 ends the learning. In the case where the learning end command is not issued, the processing is returned to step S111, and the machine learning device 6 continues the learning.

In the case where the moving average value of the errors is determined to be greater than the set value in step S122, the processing is returned to step S111, and the machine learning device 6 continues the learning. In the case where it is determined that any light output command is not issued by the control circuit 33 in step S111, the processing proceeds to step S124.

The machine learning device 6 repeatedly executes the steps from step S101 to step S124 as described above, thereby enabling to build the learning model in batch learning, by using the samples in pairs of the input data including at least the data of light output command and the data of incident light illuminance distribution, and the labels corresponding to the evaluation values indicating whether the laser optical system is in a normal state or an abnormal state.

The machine learning device 6 further updates the learning model in online learning, to continue the learning. As a result of the learning, the machine learning device 6 is able to output a prediction value excellent in precision with respect to new input data, by using the learning model. The machine learning device 6 acquires the data of incident light illuminance distribution included in the input data, specifically not only the data at the time when obvious abnormality occurs, but also the data in the form of continuous video up to that time point, and learns the characteristics of the input data including the data of incident light illuminance distribution before the occurrence of obvious abnormality. Therefore, the laser machining system 1A is able to stop or reduce the output of laser beam before obvious abnormality occurs and the laser optical system is damaged.

That is, the laser machining system 1A in the present embodiment uses the learning model 64 built by the supervised learning, thereby enabling to detect abnormality occurring in the laser optical system in response to even slight change in the incident light illuminance distribution detected during laser emission. Accordingly, the laser machining system 1A is capable of preventing abnormality from being expanded, by controlling the output of laser beam or other method, prior to the occurrence of the damage of the level requiring replacement of the laser optical component 34 or the like.

In the present embodiment, the machine learning device 6 is configured to carry out the learning by the supervised learning. Alternatively, the label acquiring part 62 may function as a determination data acquiring part, and the learning part 63 may include a reward calculation part and a value function updating part. The machine learning device 6 with the above configuration may continue the learning in the reinforcement learning including the steps of: outputting, as action data, the modified laser drive conditions including the modified light output command issued to the control circuit 33 as necessary, by using the value function obtained through the learning with respect to the input data including the acquired incident light illuminance distribution; acquiring the determination data with respect to the action data; calculating reward on the basis of the determination data; and updating the value function on the basis of the reward.

In the case where, in such reinforcement learning, the machine learning device 6 detects the occurrence of minor abnormality and outputs appropriate modified laser drive conditions, and thereby succeeds in avoiding the laser optical system from being damaged, the machine learning device 6 acquires a positive reward through calculation. However, in the case where the machine learning device 6 detects the occurrence of minor abnormality and outputs modified laser drive conditions, but fails to avoid the laser optical system from being damaged, the machine learning device 6 acquires a negative reward through calculation. In the case where the machine learning device 6 fails to detect the occurrence of minor abnormality and does not output modified laser drive conditions, and thereby fails to avoid the laser optical system from being damaged, the machine learning device 6 acquires a large negative reward through calculation. This allows the machine learning device 6 to advance the learning, so as to avoid the laser optical system from being damaged in the case of detecting the occurrence of minor abnormality and outputting appropriate modified laser drive conditions. It is noted that the algorithm for general supervised learning and the algorithm for general reinforcement learning may be used respectively as the algorithms for supervised learning and reinforcement learning.

Eighth Embodiment

A laser machining system according to an eighth embodiment conceptionally has the same configuration as the configuration of the laser machining system according to the seventh embodiment shown in FIG. 8, and thus the block diagram of the laser machining system in the present embodiment will be omitted. The laser machining system in the present embodiment is communicably connected to the machine learning device 6. The machine learning device 6 acquires, as input data through the status observing part 61, at least the image data of the machining surface 51 of the workpiece 5 acquired by the image processing circuit 35 and any one of the third image capturing device 16, the fourth image capturing device 17, the second color image capturing device 16a, and the third color image capturing device 17a, and the time series data of the laser machining condition data. The machine learning device 6 then acquires the time series data of the evaluation value relevant to the quality in the laser machining result corresponding to the input data, as a label through the label acquiring part 62, prepares many samples in pairs of the input data and the labels as teacher data, learns the relation between the input data and the labels by the supervised learning, and builds the learning model. This allows the machine learning device 6 to output, to the laser device 3 as the prediction value, the prediction result indicating the quality in the laser machining result and the change in the laser machining result caused by the change in the laser machining conditions, by using the built learning model, with respect to the new input data including the image data of the machining surface 51 of the workpiece 5 acquired during the laser machining and the laser machining condition data. In the case where the output prediction result indicates that the laser machining result will not be excellent, the laser device 3 modifies the laser machining conditions on the basis of the prediction result.

The laser machining condition data may include not only the light output, the light output waveform and the beam mode of the laser beam 12 to be emitted from the machining head 2 on the basis of the light output command issued by the control circuit 33, and the laser beam output condition data such as of an F-number of the condenser lens 22 of the machining head 2, but also the relative condition data of the machining head 2 to the workpiece 5, such as the relative moving speed of the machining head 2 to the workpiece 5, the relative position of the machining surface 51 of the workpiece 5 to the focal point of the laser beam 12, and the angle of the light axis of the laser beam 12 emitted from the machining head 2 to the machining surface 51 of the workpiece 5, and the gas supply condition data, such as type, pressure, and flow rate of gas such as assist gas and shielding gas, and other data. The laser machining condition data may further include workpiece condition data such as material and thickness of the workpiece 5.

The laser machining system 1A may be equipped with an evaluation device such as a digital two-dimensional image capturing device, a CCD measuring microscope, a contact type surface roughness and shape measuring device, a laser microscope (shape measuring microscope), a non-contact type three-dimensional measuring device, a photoexcitation non-destructive inspection system configured with a light source and an infrared camera, an ultrasonic flaw detection testing device, an induction heating type non-destructive inspection system, a radiation transmissive image capturing device, or an acoustic emission testing device, so as to acquire the evaluation value relevant to the determination of the quality in the laser machining result in real time during the laser machining. However, the accurate quality of the laser machining state during the laser machining is not always easily acquired. Therefore, the laser machining system 1A may learn the relation between the input data and the labels, by evaluating the quality of the laser machining state for each laser machining position after the laser machining, preparing the laser machining condition data at the time of executing the laser machining for each laser machining position and the time series data of the image data of the machining surface 51 of the workpiece 5, as the input data, preparing the time series data of the corresponding evaluation value indicating the quality for each laser machining position as the labels, and inputting the samples in pairs of the input data and the labels into the learning part 63.

That is, the machine learning device 6 temporarily and singly recodes the input data including at least the image data of the machining surface 51 of the workpiece 5 and the laser machining condition data, as time series data added with input data acquisition time. After the laser machining, the machine learning device 6 converts the evaluation value indicating the quality in the laser machining result for each laser machining position into the time series data of the evaluation value (label) indicating the quality in the laser machining result for each laser machining time. The machine learning device 6 may thereafter prepare the samples in pairs of the input data including the image data of the machining surface 51 of the workpiece 5 and the laser machining condition data, in which the input data acquisition time and the laser machining time are matched mutually, and the time series data of the evaluation value indicating the quality in the laser machining result, and the learning part 63 may learn the relation between the input data and the labels with the many samples in pairs as teacher data.

In the present embodiment, the input data including the image data of the machining surface 51 of the workpiece 5 and the laser machining condition data, and the evaluation value indicating the quality in the laser machining result are both acquired as time series data. This is because the machine learning device 6 is configured not only to learn the relation at a certain moment between the input data including the image data of the machining surface 51 of the workpiece 5 and the laser machining condition data, and the evaluation value indicating the quality in the laser machining result, but also to learn the relation between the input data including the image data of the machining surface 51 of the workpiece 5 and the laser machining condition data acquired repeatedly at predetermined time intervals, and the evaluation value indicating the quality in the laser machining result.

The learning of the relation between the evaluation value indicating the quality in the laser machining result and the input data including the image data of the machining surface 51 of the workpiece 5 and the laser machining condition data acquired repeatedly at predetermined time intervals results in learning how the image data of the machining surface 51 of the workpiece 5 and the evaluation value indicating the quality in the laser machining result are changed, as the laser machining conditions are changed in the continuous time series data. Therefore, the machine learning device 6 is able to predict, by using the learning model 64 built by the learning, the quality in the laser machining result with respect to the image data of the machining surface 51 of the workpiece 5 and the laser machining condition data acquired during the laser machining. Accordingly, in the case where the output prediction result indicates that the laser machining result will not be excellent, the laser machining system 1A is able to modify the current laser machining conditions to the laser machining conditions allowing to provide excellent laser machining result.

Figure 10A:
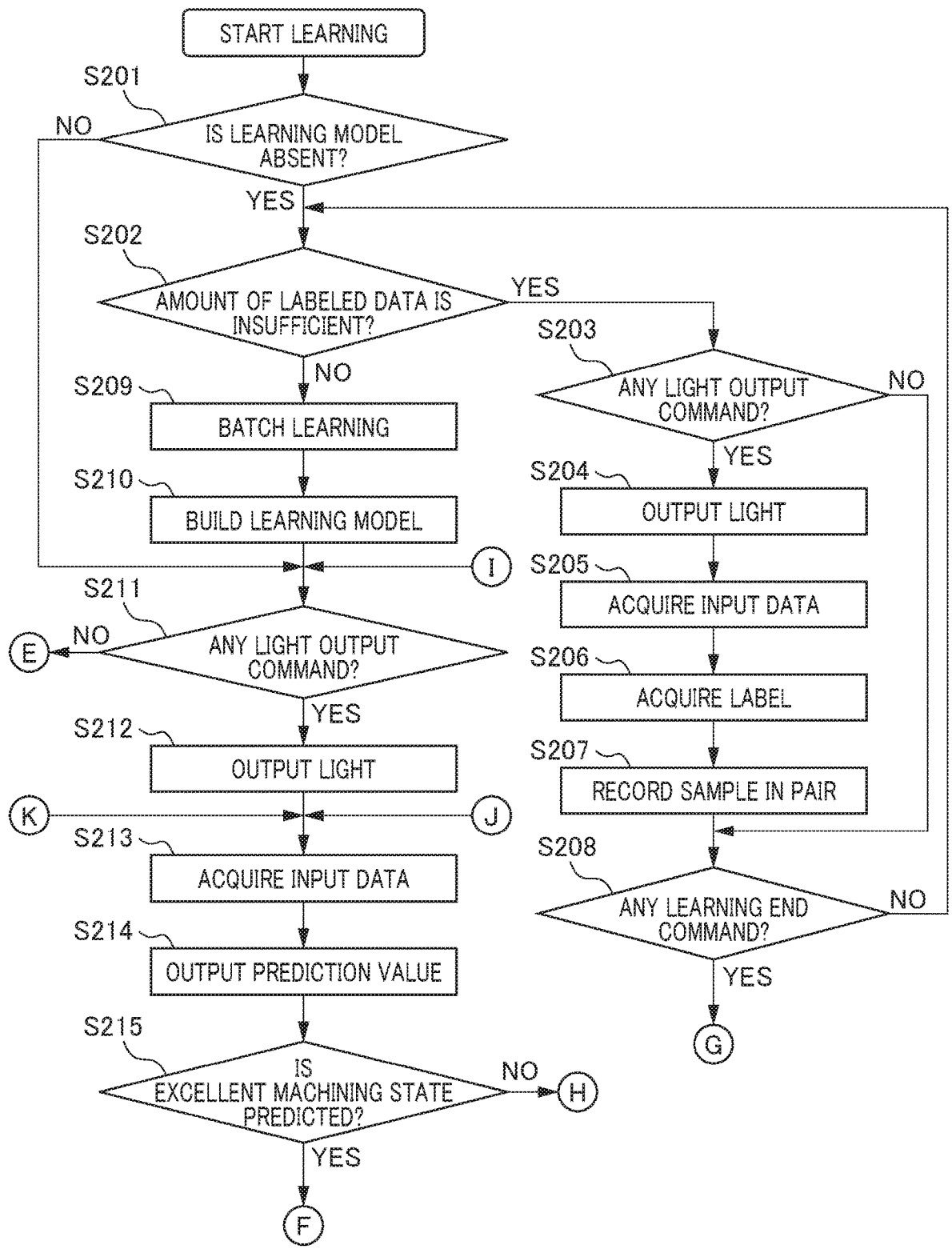
FIG. 10A is a flowchart indicating an example of process of learning by machine learning in a laser machining system according to an eighth embodiment.
Figure 10B:
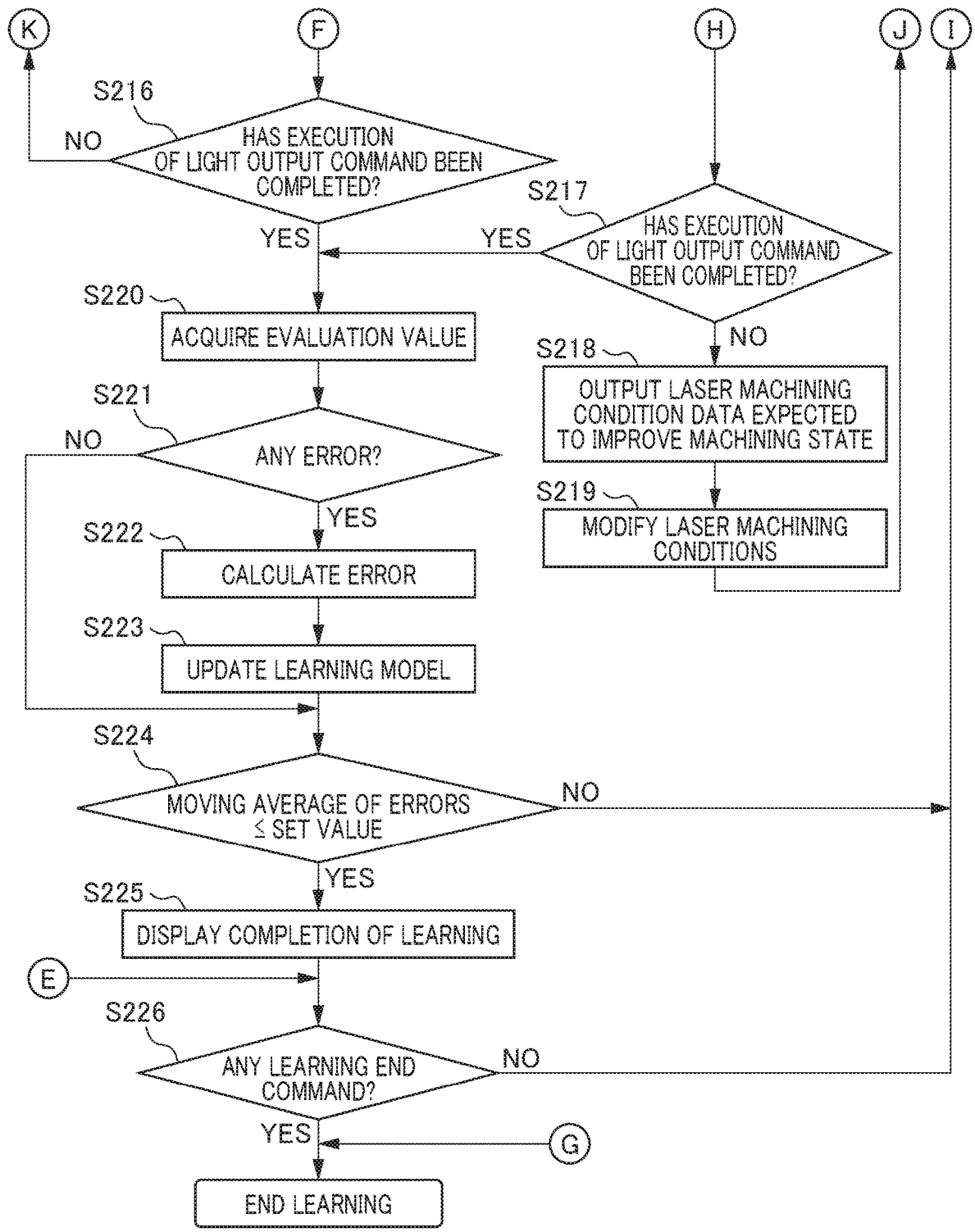
FIG. 10B is another flowchart indicating the example of process of learning by machine learning in the laser machining system according to the eighth embodiment.

Each of FIG. 10A and FIG. 10B is a flowchart indicating the process of learning by machine learning in the laser machining system in the present embodiment. The process herein includes the same process shown in FIG. 9A and FIG. 9B, except the steps from step 215 to step S219 in place of the steps from step S115 to step S117. However, in some steps even with the same description, the contents in learning may be different from those in FIG. 9A and FIG. 9B. Therefore, the steps in FIG. 10A and FIG. 10B even including some parts overlapped with the contents in FIG. 9A and FIG. 9B will be described below.

When the learning is started, the learning part 63 first determines whether or not the learning model 64 is already present in the learning part 63 (step S201). In the case where the learning model 64 is determined to be absent, the machine learning device 6 determines whether or not the amount of the labeled data recorded in the labeled data recording part 65 is insufficient to perform the machine learning by the supervised learning (step S202). In the case of determining the amount of the labeled data as being insufficient, the machine learning device 6 determines whether or not any light output command is issued by the control circuit 33 (step S203). In the case where the light output command is output by the control circuit 33, a laser beam is output (step S204). Therefore, in synchronization with the output of the laser beam, the learning part 63 acquires, as input data through the status observing part 61, the time series data including at least the laser machining condition data including the commands issued by the control circuit 33 to respective parts of the laser machining system 1A, and the image data of the machining surface 51 of the workpiece 5 acquired by the image processing circuit 35 and any one of the third image capturing device 16, the fourth image capturing device 17, the second color image capturing device 16a, and the third color image capturing device 17a (step S205). The image data of the machining surface 51 of the workpiece 5 corresponds to the time series data acquired at predetermined time intervals as in video data. Each piece of the image data, and the time series data of the acquisition time when the piece of the image data is acquired, and the laser machining condition data of the acquisition time are temporarily recorded in a set in a memory included in the status observing part 61 or the learning part 63.

The machine learning device 6 then acquires, through the label acquiring part 62, the time series data of the evaluation value relevant to the determination of the quality in the laser machining result, as a label (step S206). In the present embodiment, in order to accurately determine the quality in the laser machining result, the machine learning device 6 acquires, after the laser machining, the evaluation value relevant to the determination of the quality in the laser machining result for each laser machining position, as a label, by using such an evaluation device as described above. A label for each laser machining position is treated as a label of time series data for each time point of laser machining at the position, and is made into a pair with the input data added with input data acquisition time which is temporarily recorded as the above-described time series data, so as to be matched mutually in time point, as the identical time sample including the input data and the label, and then recorded in the labeled data recording part 65 (step S207).

In step S208, the machine learning device 6 determines whether or not any learning end command is issued to the learning part 63 from the outside. In the case where the learning end command is issued, the machine learning device 6 ends the learning. In the case where any learning end command is not issued, the processing is returned to step S202. In the case where, in step S202, the amount of the labeled data recorded in the labeled data recording part 65 is determined not to be insufficient to perform the machine learning by the supervised learning, the learning part 63 reads the many samples in pairs of the input data and the labels both recorded as the time series data in the labeled data recording part 65, learns the relation between the input data and the labels in batch learning (step S209), and builds the learning model 64 (step S210). In the case where, in step S203, it is determined that any light output command is not issued by the control circuit 33, the processing proceeds to step S208.

In the present embodiment, after the learning model 64 is built in step S210, the learning is switched to online learning, and whether or not any light output command is issued by the control circuit 33 is determined (step S211). It is noted that, in the case where, in step S201, the learning model 64 is determined to be present, the processing directly proceeds to step S211.

When the light output command is issued by the control circuit 33, a laser beam is output (step S212). Therefore, in synchronization with the output of the laser beam, the learning part 63 acquires, as input data through the status observing part 61, the laser machining condition data as described above and the image data of the machining surface 51 of the workpiece 5 (step S213), and outputs the prediction value corresponding to the evaluation value of the label, by using the learning model 64 serving as learning result, with respect to the input data (step S214). That is, the machine learning device 6 outputs the prediction value relevant to the quality in the laser machining result for each of the image data acquired under each laser machining condition acquired as input data.

The machine learning device 6 then determines in real time whether or not the prediction value output by the learning part 63 corresponds to the prediction result indicating excellent laser machining result (step S215). In the case of determining that the prediction value corresponds to the prediction result indicating excellent laser machining result, the machine learning device 6 determines whether or not the execution of the light output command issued by the control circuit 33 has been completed (step S216). In the case where it is determined that the execution of the light output command has not been completed, the processing is returned to step S213, and the machine learning device 6 acquires the laser machining condition data and the image data of the machining surface 51 of the workpiece 5, as input data. As described above, the machine learning device 6 acquires the laser machining condition data and the image data of the machining surface 51 of the workpiece 5, as input data, one after another at predetermined time intervals until the execution of the light output command is completed, and records temporarily and singly the input data as time series data in the memory.

In the case of, in step S215, determining that the prediction value does not correspond to the prediction result indicating excellent laser machining result, the machine learning device 6 determines whether or not the execution of the light output command issued by the control circuit 33 has been completed (step S217). In the case where it is determined that the execution of the light output command has been completed, the learning part 63 outputs, to the control circuit 33, the modification laser machining condition data which is expected to improve the laser machining state, by using the built learning model 64 (step S218). The control circuit 33 receives the modification laser machining condition data, and modifies the laser machining conditions (step S219).

Then, the processing is returned to step S213. The machine learning device 6 acquires, as input data, the modification laser machining condition data, and the image data of the machining surface 51 of the workpiece 5 subjected to the laser machining under the modified laser machining conditions, and outputs the prediction value relevant to the quality in the laser machining result with respect to the input data (step S214). In the case of, in step S216 or in step S217, determining that the execution of the light output command has been completed, the machine learning device 6 acquires the evaluation value indicating the quality in laser machining result corresponding to each time point in the time series data of the laser machining conditions and the image data of the machining surface 51 of the workpiece 5 recorded in the memory by that time (step S220).

The learning part 63 then compares the prediction value relevant to the quality in the laser machining result output in step S214, and the evaluation value relevant to the quality in the laser machining result acquired in step S220. Alternatively, the machine learning device 6 compares the laser machining result predicted with respect to the modification laser machining condition data expected to improve the laser machining state with respect to the prediction value indicating that the laser machining result will not be excellent, and the evaluation value relevant to the laser machining result based on the modification laser machining condition data acquired in step S220. With the comparison, the machine learning device 6 determines whether or not there is an error between the prediction value relevant to the quality in the laser machining result and the evaluation value relevant to the quality in the laser machining result, or between the change in the expected laser machining result to the modification in the laser machining condition data and the change in the evaluation value relevant to the quality in the laser machining result (step S221). In the case of determining that there is an error, the machine learning device 6 calculates the error (step S222), and updates the learning model 64 on the basis of the calculated error (step S223).

Then, in order to evaluate the level of learning, the machine learning device 6 compares the moving average value of the errors having been calculated with the set value which is set as a target, and determines whether or not the moving average value of the errors is equal to or smaller than the set value (step S224). In the case of determining that the moving average value of the errors is equal to or smaller than the set value, the machine learning device 6 may display the information indicating the completion of the learning on the display device (not shown) (step S225). In the case where, in step S221, it is determined that there is no error, the processing proceeds directly to step S224.

The machine learning device 6 determines whether or not any learning end command is issued through the input device (not shown) or the like, in response to the display of the completion of the learning in step S225 (step S226). In the case where the learning end command is issued, the machine learning device 6 ends the learning. In the case where any learning end command is not issued, the processing is returned to step S211, and the machine learning device 6 continues the learning. In the case where, in step S224, the moving average value of the errors is determined to be greater than the set value, the processing is returned to step S211, and the machine learning device 6 continues the learning. In the case where, in step S211, it is determined that any light output command is not issued by the control circuit 33, the processing proceeds to step S226.

As described above, the laser machining system 1A repeatedly executes the operation from step S201 to step S226, and thereby first enables to build the learning model in batch learning, by using the samples in pairs of the input data including the laser machining condition data and the image data of the machining surface 51 of the workpiece 5, and the labels of the evaluation values relevant to the quality in the laser machining result. The laser machining system 1A then updates the learning model by online learning, to advance the learning. As a result of the learning, the laser machining system 1A is able to output a prediction value excellent in precision with respect to new input data, by using the learning model. That is, the laser machining system 1A in the present embodiment is able to predict the quality in the laser machining result, with respect to the input data including the laser machining condition data and the image data of the machining surface 51 of the workpiece 5 acquired during the laser machining, by using the learning model 64 built by the supervised learning. In the case where the prediction result indicates that the laser machining result will not be excellent, the laser machining system 1A is able to modify the current laser machining conditions to the laser machining conditions allowing to provide excellent laser machining result.

The method of visually observing the image data of the machining surface 51 of the workpiece 5 acquired by an image capturing device leads to significant increase in man-hour because a human has to observe the machining state during the laser machining all the time. Not only that, in the method, the laser machining conditions are hardly switched to appropriate conditions manually and immediately, even when it is determined that the laser machining state is not excellent. However, the laser machining system 1A with the application of the machine learning is able to automatically control the laser machining conditions to the conditions allowing to provide excellent laser machining result.

It is noted that, in the present embodiment, the machine learning device 6 is configured to perform the learning by the supervised learning. Alternatively, the label acquiring part 62 may be made to function as a determination data acquiring part, and the learning part 63 may include a reward calculation part and a value function updating part. In the case where the prediction result with respect to the input data including the acquired image data of the machining surface 51 of the workpiece 5 and the laser machining condition data indicates that the laser machining result will not be excellent, the machine learning device 6 with the above configuration may continue the learning by the reinforcement learning including the steps of: outputting the modified laser machining conditions as action data by use of the value function serving as learning result; acquiring the determination data to the action data; calculating reward on the basis of the determination data, and updating the value function on the basis of the reward.

In the case where, in such reinforcement learning, the original laser machining conditions are modified by use of the output modified laser machining conditions, and the laser machining result is improved by the modification, the machine learning device 6 acquires a positive reward through calculation. Conversely, in the case where the laser machining result is degraded, the machine learning device 6 acquires a negative reward. The machine learning device 6 acquires a large positive reward as the improvement effect is larger, and acquires a larger negative reward as the degradation effect is larger, thereby enabling to advance the learning to output more appropriately modified laser machining conditions. It is noted that the algorithm for general supervised learning and the algorithm for general reinforcement learning may be used respectively as the algorithms for the reinforcement learning and the supervised learning in the present embodiment.

The machine learning device 6 may include both the learning model 64 learned in the seventh embodiment and the learning model 64 learned in the present embodiment. The machine learning device 6 with the above configuration may output not only the prediction result relevant to whether the laser optical system is in a normal state or an abnormal state, with respect to each input data including the data of incident light illuminance distribution, but also the prediction result relevant to the quality in the laser machining result and the change in the laser machining result caused by the change in the laser machining conditions, with respect to the input data including the laser machining condition data and the image data of the machining surface 51 of the workpiece 5. In the case where the prediction result indicates that the laser machining result will not be excellent, the machine learning device 6 may modify the laser machining conditions on the basis of the prediction result.

Ninth Embodiment

Figure 11:
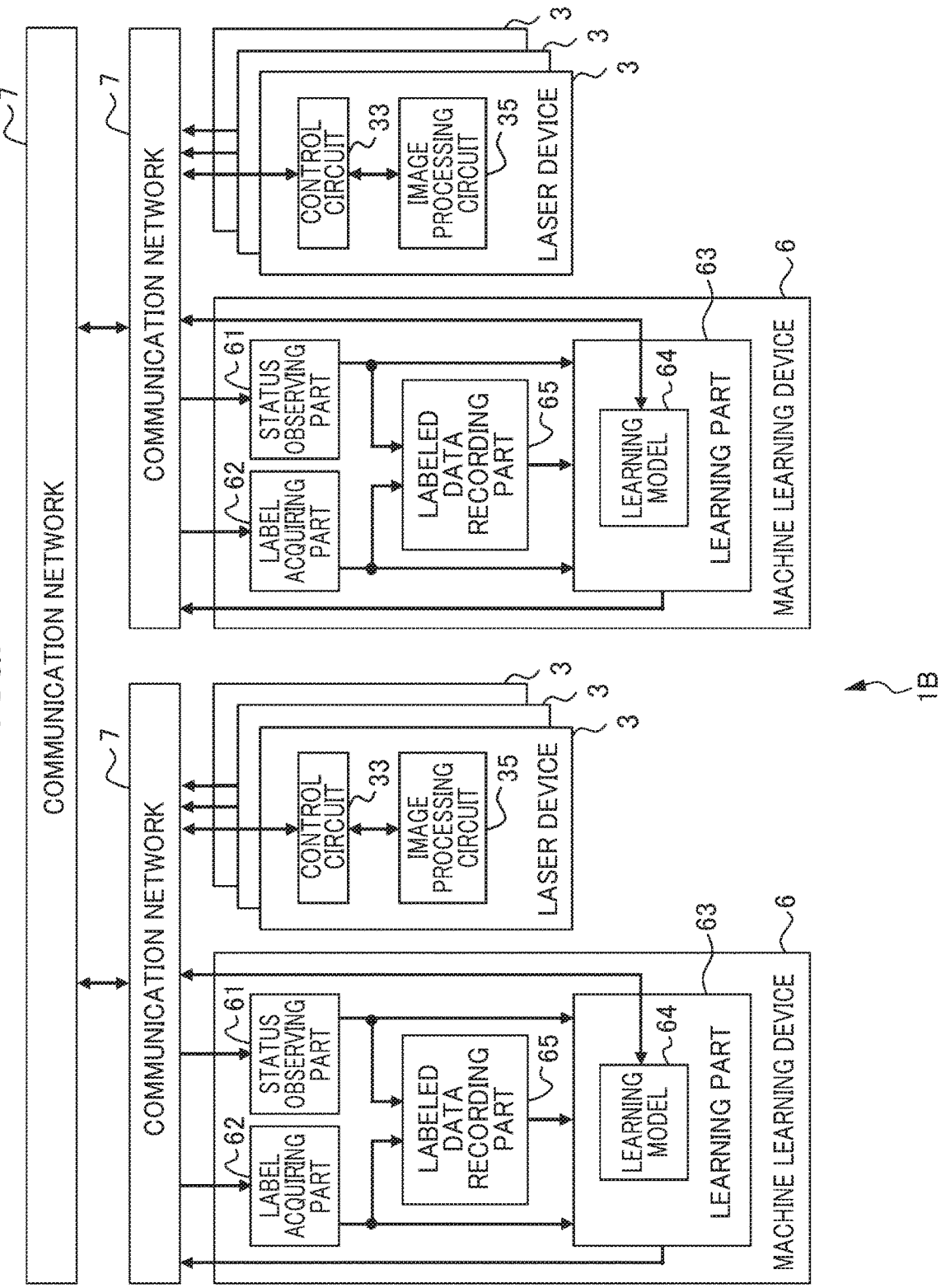
FIG. 11 is a block diagram illustrating a configuration in a conceptual manner of a laser machining system according to a ninth embodiment.

FIG. 11 is a block diagram illustrating a configuration in a conceptual manner of a laser machining system according to a ninth embodiment. As in FIG. 1, each of the arrows in thick solid lines schematically indicates a signal line and the like, and the direction thereof. In a laser machining system 1B in the present embodiment, the machine learning device 6 described above is communicably connected to a plurality of the laser devices 3 via a communication network 7. The machine learning device 6 with the above connection performs supervised machine learning, by utilizing the input data and the labels in pairs acquired from the plurality of laser devices 3. It is noted that each of the illustrated laser devices 3 includes only the control circuit 33 and the image processing circuit 35, and the illustration of the laser optical system including the machining head and the like is omitted. Although each of the laser devices 3 and the machine learning device 6 is connected to the communication network 7 via a communication interface device or a communication interface circuit, neither of them is illustrated.

Each of the laser devices 3 is configured with many elements, just as for the elements in the laser optical system, including a laser oscillator, a delivery fiber, and a machining head. The laser device 3 configured with a different configuration acquires a different learning result. Accordingly, it is difficult to acquire sufficient learning result in an early stage by utilizing the samples in pairs of the input data and the labels output by a small number of the laser devices 3. Therefore, the learning carried out by utilizing the information output by a plurality of the laser devices 3 allows to advance the learning speedily and improve the precision in the learning.

As shown in FIG. 11, a plurality of the machine learning devices 6 may perform distributed learning by sharing the learning model 64 via the communication network 7, so as to advance the learning more speedily and further improve the precision in the learning.

Tenth Embodiment

Figure 12:
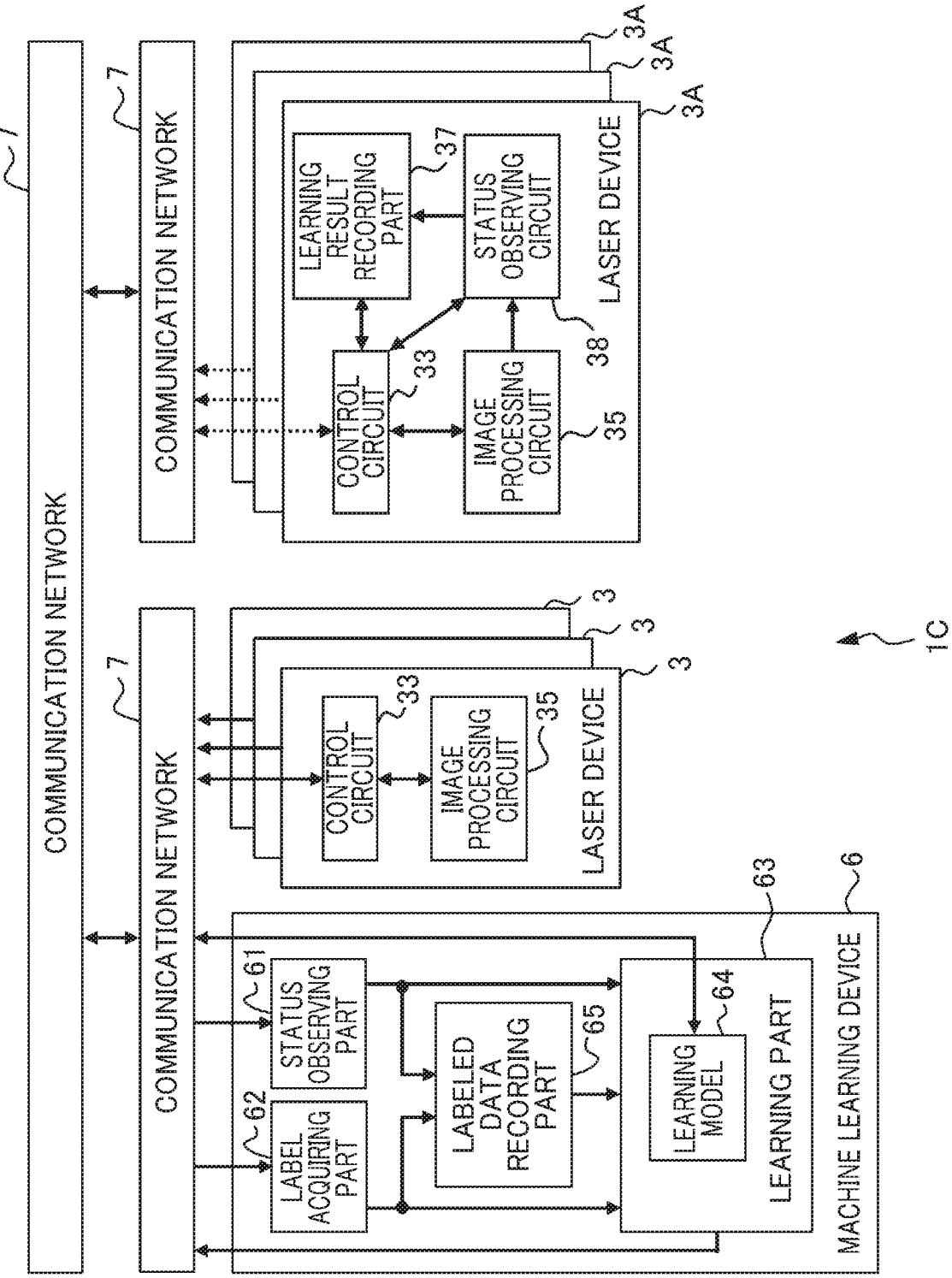
FIG. 12 is a block diagram illustrating a configuration in a conceptual manner of a laser machining system according to a tenth embodiment.

FIG. 12 is a block diagram illustrating a configuration in a conceptual manner of a laser machining system according to a tenth embodiment. As in FIG. 1, each of the arrows in thick solid lines schematically indicates a signal line and the like, and the direction thereof. In a laser machining system 1C in the present embodiment, a laser device 3A includes a learning result recording part 37 configured to record the learning model 64, and a status observing circuit 38. The learning result recording part 37 records the learning model 64 built by the machine learning device 6 included in the laser machining system 1A of the seventh embodiment to the ninth embodiment. The laser device 3A outputs, by using the learning model 64 recorded in the learning result recording part 37, a prediction value with respect to the input data input into the learning result recording part 37, through the status observing circuit 38 having the same function as the status observing part 61 in the machine learning device 6 of the seventh embodiment to the ninth embodiment.

That is, when the machine learning device 6 ends the learning, the laser device 3A is able to output a prediction value and action data with respect to the input data, merely by the status observing part and the learning result. Therefore, the laser device 3A in the laser machining system 1C in the present embodiment includes the status observing circuit 38 having the function of the status observing part, and the learning result recording part 37 including hardware such as a CPU or an FPGA with the software of a neural network and recording the learning result, not included in the machine learning device 6, so as to output a prediction value and action data with respect to the input data.

In the laser device 3A including the learning result recording part 37, the image processing circuit 35 converts the output by any one of the first to fourth image capturing devices 13, 14, 16, 17 and the first to third color image capturing devices 15, 16a, 17a, into the data of incident light illuminance distribution of the output laser beam and the image data of the machine surface 51 of the workpiece 5. The status observing circuit 38 acquires, as input data, the data including the data of incident light illuminance distribution from the image processing circuit 35 and the internal data of the laser device 3A such as a light output command from the control circuit 33, and the data including the image data of the machining surface 51 of the workpiece 5 from the image processing circuit 35 and the laser machining condition data, and outputs the data to the learning result recording part 37. This allows the learning result recording part 37 to detect abnormality in the laser optical system, in response to even slight change in the incident light illuminance distribution detected during laser emission, by using the learning result recorded in the learning result recording part 37. Therefore, the laser device 3A is able to prevent abnormality from being expanded before the occurrence of the damage of the level requiring replacement of the laser optical component 34 or the like, by controlling the output of the laser beam or other method. Alternatively, the learning result recording part 37 is able to predict the quality in the laser machining result. Therefore, in the case where the prediction result indicating that the laser machining result will not be excellent, the laser device 3A is able to modify the laser machining conditions.

It is noted that each of the laser devices 3 illustrated in FIG. 12 includes only the control circuit 33 and the image processing circuit 35, and the illustration of the laser optical system including the machining head and the like is omitted. Similarly, as for each of the illustrated laser devices 3A including the learning result recording part 37, each of the laser devices 3A includes only the control circuit 33, the image processing circuit 35, the learning result recording part 37 and the status observing circuit 38, and the illustration of the laser optical system including the machining head and the like is omitted.

The learning result by the machine learning device 6 may be ported to the learning result recording part 37 of the laser device 3A via a magnetic recording medium or the like, or via the communication network 7, as shown in FIG. 12.

The configuration of the laser device 3A including the learning result recording part 37 and the status observing circuit 38 eliminates the need of the continuous connection to the machine learning device 6 via the communication network 7, after the porting of the learning result such as the learning model 64 or the value function to the learning result recording part 37. In the case where the laser device 3A including the learning result recording part 37 and the status observing circuit 38 is changed to have a new configuration different from the conventional configuration of the laser device including the laser optical system, the control circuit 33 of the laser device 3A shall acquire the learning result such as the learning model or the value function built by the laser device having the configuration corresponding to the new configuration of the laser device 3A, from the machine learning device 6 via the communication network 7, to add them to the learning result recorded in the learning result recording part 37, or update the learning result.

In FIG. 12, each of the arrows in thick dashed lines schematically indicates the communication line which is to be connected only when required, and may not be connected to the communication network 7 unless the learning result is to be acquired from the machine learning device 6. Once the learning result is ported into the laser device 3A, the learning result is available even when the laser device 3A is disconnected from the communication network 7, thereby eliminating time delay in communication, and enabling to detect abnormality more promptly. The porting further eliminates the need of occupying the machine learning device 6, resulting in reducing operation cost.

The learning result of the machine learning device 6 may be ported via a magnetic recording medium or the like, instead of being ported via the communication network 7 as described above. Therefore, the porting of the learning result of the machine learning device 6 to the laser device 3A eliminates the need of the large-sized laser device 3A even in the location where the communication network environment is insufficient, and allows to provide the high-value-added laser device 3A in which the result of the machine learning is available.

As described above, each of the embodiments of the present disclosure is capable of promptly and sensitively detecting minor abnormality substantially not causing much variation in the light quantity of the output laser beam in the laser optical system and the like, thereby enabling to properly control the output laser beam and the like prior to the occurrence of damage in the laser optical system and the like, at least prior to the damage expanded in a wide range of the laser optical system and the like. Some position where the illuminance of the reflected light 122 coming from the workpiece 5 is high is appeared such as in the case where the optical axis of the laser beam 12 emitted from the machining head 2 toward the machining surface 51 of the workpiece 5 is not perpendicular to the machining surface 51 of the workpiece 5, and the case where the focal point to which the laser beam 12 emitted toward the machining surface 51 of the workpiece 5 is condensed is not adjusted on the machining surface 51 of the workpiece 5. In this case, each of the laser machining systems 1, 1A, 1B, 1C according to the present embodiments is capable of promptly and sensitively detecting such a state, and properly controlling the output laser beam and the like prior to the occurrence of damage at the position where the illuminance of the reflected light 122 is high. In addition, each of the laser machining systems 1, 1A, 1B, 1C according to the present embodiments is capable of predicting the quality in the laser machining result on the basis of the image data of the machining surface 51 of the workpiece 5 and the laser machining conditions, and modifying the laser machining conditions in the case where the prediction result indicating that the laser machining result will not be excellent.

The examples and the terms herein are all indicated for the purpose of teaching and helping a reader in understanding the concept contributed by the present inventors in terms of facilitation of the present disclosure and the present art. It shall be understood that the present specification is not intended to limit a configuration or a condition to any of the specific examples and conditions herein related to the indication of the superiority or inferiority of the present invention.

In an example, each of the wavelength selective mirrors 24, 24A to 24E is disposed between the collimating lens 21 and the condenser lens 22, or alternatively may be disposed between the termination surface 41 of the optical fiber 4 and the collimating lens 21, or between the condenser lens 22 and the protective window 23. In another example, each of the image capturing devices 13 to 17 may have a focusing mechanism or an aperture mechanism, or may have, as appropriate, a special lens such as a fisheye lens or a zoom lens, an optical filter configured to selectively transmit or shield light according to a wavelength, or the like. In another example, each of the image capturing devices 13 to 17 may be cooled by cooling water, an electronic cooling element or the like, in order to reduce the influence in sensitivity by temperature. Alternatively, in order to correct the change in sensitivity by temperature, each of the image capturing devices 13 to 17 may have a temperature sensor configured to measure temperature of each of the solid-state image capturing elements 131, 141, 151, 161, 171 of the image capturing devices 13 to 17. As pixels of each of the image capturing devices 13 to 17, thermal sensors even with lower sensitivity and response rate may be used, in place of quantum sensors such as photodiodes. In another example, in order to provide the machining head 2 in lighter weight, each of the image capturing devices 13 to 17 may be disposed away from the machining head 2, and an image fiber leading from a position of each of the image capturing surfaces 132, 142, 152, 162, 172 of the image capturing devices 13 to 17 of FIG. 2 to FIG. 7 may be configured to transmit an image to each of the image capturing devices 13 to 17.

Although the embodiments of the present disclosure have been detailed, it shall be understood that the present disclosure may further include various changes, replacements, and modifications without departing from the gist and scope of the present disclosure.

What is claimed is:

1. A laser machining system comprising:
   a laser device configured to output a laser beam; and
   a machining head configured to emit the laser beam toward a workpiece in order to perform laser machining, the laser beam emitted by a laser oscillator of the laser device and propagated through an optical fiber,
   the machining head including:
   at least one wavelength selective mirror having wavelength selectivity with various values of reflectivity and transmittance according to wavelengths; and
   at least one image capturing device, wherein
   the laser machining system monitors abnormality in a laser optical system leading from the laser oscillator to the machining head, during the laser machining, by reflecting selected wavelengths of light propagated from the laser oscillator at a side of introduction of the laser beam into the machining head via the wavelength selective mirror, making the selected wavelengths of the light incident on an image capturing surface of the image capturing device, and detecting an incident light illuminance distribution appearing on the image capturing surface of the image capturing device, and
   at least a portion of the selected wavelengths of the light propagated from the laser oscillator is reflected by the wavelength selective mirror upstream from a laser beam emitting end of the machining head and onto the image capturing surface of the image capturing device before the laser beam reaches the laser beam emitting end of the machining head, the laser beam emitting end of the machining head being an end of the machining head where the laser beam is emitted from the machining head toward the workpiece.

2. The laser machining system according to claim 1, wherein
   at least the one image capturing device is a first image capturing device including a pixel having sensitivity at least to light having a wavelength of a laser beam,
   the laser beam emitted from a termination surface of the optical fiber connected to the machining head is made incident to a plurality of the pixels of the image capturing surface of the first image capturing device, and
   the first image capturing device detects the incident light illuminance distribution appearing on the image capturing surface of the first image capturing device of the laser beam emitted from the termination surface of the optical fiber, and thereby
   the laser machining system monitors abnormality in the laser optical system leading from the laser oscillator to the machining head.

3. The laser machining system according to claim 1, wherein
   at least the one image capturing device is a second image capturing device including a pixel having sensitivity to light having at least one wavelength other than a wavelength of a laser beam, and
   the second image capturing device is capable of capturing an image of at least a laser beam introduction side inner wall of a machining head body container.

4. The laser machining system according to claim 3, wherein
the laser machining system is connected to a machine learning device, and
the machine learning device is configured to:
acquire, as input data, at least light output command data issued to the laser oscillator and data of the incident light illuminance distribution;
acquire, as a label, an evaluation value indicating whether the laser optical system leading from the laser oscillator to the machining head is in a normal state or an abnormal state;
prepare the input data and the label in a pair as teacher data;
learn relation between the input data and the label by supervised learning and build a learning model;
output, as a prediction value, prediction result indicating presence or absence of the abnormality in the laser optical system leading from the laser oscillator to the machining head, by using the learning model, with respect to new input data including at least light output command data and data of the incident light illuminance distribution; and
when the prediction result indicating occurrence of the abnormality in the laser optical system is output, stop or reduce the output laser beam to be output by the laser device.

5. The laser machining system according to claim 4, wherein
the machine learning device is communicably connected to a plurality of the laser devices via a communication network, and
the machine learning device performs the supervised learning, by utilizing the input data and the label in the pair acquired from the plurality of laser devices.

6. The laser machining system according to claim 5, wherein
at least one of the laser devices including:
a learning result recording part configured to record the learning model, wherein
the laser machining system records the learning model built by the machine learning device, in the learning result recording part, and
outputs the prediction value with respect to data input in the learning result recording part, by using the learning model recorded in the learning result recording part.

7. The laser machining system according to claim 1, wherein
the image capturing device is a first color image capturing device including pixels having respectively different sensitivity at least to light having a wavelength of a laser beam and to light having at least one wavelength other than the wavelength of the laser beam, wherein
the first color image capturing device captures an image of at least a laser beam introduction side inner wall of a machining head body container, by use of the pixel of the first color image capturing device having high sensitivity to the light having at least one wavelength other than the wavelength of the laser beam, and
detects the incident light illuminance distribution appearing on the image capturing surface of the first color image capturing device of the laser beam emitted from a termination surface of the optical fiber connected to the machining head, and made incident to a plurality of the pixels of the first color image capturing device having high sensitivity to the light having the wavelength of the laser beam, by use of the pixel of the first color image capturing device having high sensitivity to the light having the wavelength of the laser beam.

8. The laser machining system according to claim 1, the machining head further including:
an optical sensor configured to detect at least reflected light coming from the workpiece and being reflected by the wavelength selective mirror.

9. The laser machining system according to claim 1, the machining head further including:
a third image capturing device configured to acquire an image of a machining surface of the workpiece by reflecting light coming from the machining surface of the workpiece by the wavelength selective mirror.

10. The laser machining system according to claim 9, wherein
the laser machining system is connected to a machine learning device, and
the machine learning device is configured to:
acquire, as input data, at least image data of the machining surface of the workpiece and time series data of laser machining condition data;
acquire, as a label, time series data of an evaluation value indicating quality in laser machining result corresponding to the input data;
prepare the input data and the label in a pair as teacher data;
learn relation between the input data and the label by supervised learning and build a learning model;
output, as a prediction value, prediction result indicating quality in laser machining result and change in the laser machining result caused by change in laser machining conditions, by using the learning model, with respect to new input data including at least image data of the machining surface of the workpiece and laser machining condition data; and
when the prediction result indicating that the laser machining result will not be excellent is output, modify the laser machining conditions.

11. The laser machining system according to claim 1, the machining head further including:
a second color image capturing device including pixels having respectively different sensitivity at least to light having the wavelength of the laser beam and to light having at least one wavelength other than the wavelength of the laser beam, wherein
the second color image capturing device detects at least reflected light of laser beam coming from the workpiece and being reflected by the wavelength selective mirror to be made incident to the second color image capturing device, and monitors a light quantity of the reflected light, by use of the pixel of the second color image capturing device having high sensitivity to the light having the wavelength of the laser beam,
detects at least light reflected by the wavelength selective mirror to be made incident to the second color image capturing device, the light having a different wavelength from the wavelength of the laser beam coming from a machining surface of the workpiece, by use of the pixel of the second color image capturing device having high sensitivity to the light having a wavelength other than the wavelength of the laser beam, and
captures an image of a machining surface of the workpiece.

12. The laser machining system according to claim 11, the laser machining system further comprising:
a calculation circuit configured to calculate a temperature of a protective window of the machining head just before stop of laser beam emission, on a basis of time series data of light quantities of light having at least two wavelengths having been detected by the second color image capturing device since just after the stop of the laser beam emission.

13. The laser machining system according to claim 1, the machining head further including:
a reflectivity variable device capable of varying reflectivity, wherein
the image capturing device is a fourth image capturing device including a pixel having sensitivity to light having at least one wavelength other than a wavelength of a laser beam, and
the fourth image capturing device acquires at least an image of a laser beam introduction side inner wall of a machining head body container, and an image of a machining surface of the workpiece.

14. The laser machining system according to claim 13, wherein
the reflectivity variable device is any one of a digital mirror device, a liquid crystal panel, a light control mirror device, and a reflector with shutter.

15. The laser machining system according to claim 1, the machining head further including:
a reflectivity variable device capable of varying reflectivity, wherein
the image capturing device is a third color image capturing device including pixels having respectively different sensitivity at least to light having a wavelength of a laser beam and light having at least one wavelength other than the wavelength of the laser beam,
the third color image capturing device detects a light quantity of an output laser beam and the incident light illuminance distribution appearing on the image capturing surface and captures at least an image of a laser beam introduction side inner wall of a machining head body container, and further detects a light quantity of reflected light coming from the workpiece and captures an image of a machining surface of the workpiece.

16. A laser machining system comprising:
a laser device configured to output a laser beam; and
a machining head configured to emit the laser beam toward a workpiece in order to perform laser machining, the laser beam emitted by a laser oscillator of the laser device and propagated through an optical fiber,
the machining head including:
at least one wavelength selective mirror having wavelength selectivity with various values of reflectivity and transmittance according to wavelengths; and
at least one image capturing device, wherein
the laser machining system detects changes in the laser beam extending from the laser oscillator toward the machining head in a laser optical system during the laser machining, the detected changes being abnormalities, by reflecting selected wavelengths of light propagated from a side of introduction of the laser beam into the machining head by the wavelength selective mirror to make the selected wavelengths of the light incident on an image capturing surface of the image capturing device and detecting incident light illuminance distribution of the light incident on the image capturing surface of the image capturing device, and
at least a portion of the selected wavelengths of the light propagated from the laser oscillator is reflected by the wavelength selective mirror upstream from a laser beam emitting end of the machining head and onto the image capturing surface of the image capturing device before the laser beam reaches the laser beam emitting end of the machining head, the laser beam emitting end of the machining head being an end of the machining head where the laser beam is emitted from the machining head toward the workpiece.

* * * * *